(12) United States Patent
Tamano

(10) Patent No.: US 9,251,156 B2
(45) Date of Patent: Feb. 2, 2016

(54) INFORMATION PROCESSING DEVICES, METHOD, AND RECORDING MEDIUM WITH REGARD TO A DISTRIBUTED FILE SYSTEM

(75) Inventor: Hiroshi Tamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 14/005,758

(22) PCT Filed: Feb. 20, 2012

(86) PCT No.: PCT/JP2012/054675
§ 371 (c)(1),
(2), (4) Date: Sep. 17, 2013

(87) PCT Pub. No.: WO2012/127988
PCT Pub. Date: Sep. 27, 2012

(65) Prior Publication Data
US 2014/0012887 A1    Jan. 9, 2014

(30) Foreign Application Priority Data
Mar. 18, 2011    (JP) .................................. 2011-061045

(51) Int. Cl.
*G06F 17/30*    (2006.01)
(52) U.S. Cl.
CPC .... *G06F 17/30094* (2013.01); *G06F 17/30194* (2013.01)
(58) Field of Classification Search
CPC .................... G06F 17/30094; G06F 17/30194; G06F 17/30197

USPC .................................. 707/609, 636, 652, 827
See application file for complete search history.

(56) References Cited

U.S. PATENT DOCUMENTS

| | | | | |
|---|---|---|---|---|
| 7,634,453 | B1 * | 12/2009 | Bakke | G06F 17/30067 707/1 |
| 8,291,094 | B2 * | 10/2012 | Bopardikar | G06F 3/061 709/229 |
| 8,396,903 | B2 * | 3/2013 | Jellum | G06Q 10/06 707/804 |
| 2005/0149683 | A1 * | 7/2005 | Chong, Jr. | G06F 11/1466 711/162 |

FOREIGN PATENT DOCUMENTS

| | | |
|---|---|---|
| JP | 2000-67082 A | 3/2000 |
| JP | 2001-051890 A | 2/2001 |
| JP | 2003-296167 A | 10/2003 |
| JP | 2005-502121 A | 1/2005 |
| JP | 2009-98941 A | 5/2009 |

OTHER PUBLICATIONS

Carlo Curino, et al. "Schism: a Workload-Driven Approach to Database Replication and Partitioning", Proceedings of the VLDB Endowment, 2010, pp. 1-10, vol. 3, No. 1.

* cited by examiner

*Primary Examiner* — Hares Jami
(74) *Attorney, Agent, or Firm* — Sughrue Mion, PLLC

(57) ABSTRACT

An information processing device can determine, as a placement destination of object data, a storage location which is the most suitable for speeding up future processing which uses a plurality of pieces of data including the object data simultaneously, even when the object data is stored newly before use of it.

11 Claims, 26 Drawing Sheets

Fig.12

|     | D1 | D2 | ... | D5 | D6 | ... | D8 | D9 |
|-----|----|----|-----|----|----|-----|----|----|
| D1  | 0  | 0  |     | 1  | 1  |     | 0  | 0  |
| D2  | 0  | 0  |     | 0  | 1  |     | 0  | 0  |
| ... |    |    |     |    |    |     |    |    |
| D5  | 0  | 0  |     | 0  | 0  |     | 0  | 0  |
| D6  | 0  | 0  |     | 0  | 0  |     | 0  | 0  |
| ... |    |    |     |    |    |     |    |    |
| D8  | 0  | 0  |     | 0  | 0  |     | 0  | 0  |
| D9  | 0  | 0  |     | 0  | 0  |     | 0  | 0  |

Fig.13

|     | D1  | D2  | ... | D8  | D9  | ... |
|-----|-----|-----|-----|-----|-----|-----|
| ... | ... | ... | ... | ... | ... | ... |
| D8  | 0.8 | 0   | ... | 0   | 0   | ... |
| D9  | 0   | 0.6 | ... | 0   | 0   | ... |

Fig.15

| DATA | STORAGE LOCATION |
|---|---|
| D1 | R1.N1_3 R2.N2_3 |
| D2 | R2.N2_1, R13.Ni13_1 |
| ... | |
| D8 | R11.N11_3, R12.N12_2 |
| D9 | R11.N11_1, R13.N13_3 |
| ... | |

Fig.16

| NODE | REMAINING CAPACITY |
|---|---|
| /R1/N1_1 | 100GB |
| /R1/N1_2 | 80GB |
| ... | |
| /R11/N11_1 | 60GB |
| /R11/N11_2 | 90GB |
| /R11/N11_3 | 80GB |
| /R12/N12_1 | 60GB |
| /R12/N12_2 | 80GB |
| /R12/N12_3 | 120GB |
| /R13/N13_1 | 80GB |
| /R13/N13_2 | 80GB |
| /R13/N13_3 | 100GB |

RACK R11
RACK R12
RACK R13

Fig.23

|    | GENERATION PROGRAM |
|----|--------------------|
| D1 | PROGRAM A          |
| D2 | PROGRAM B          |
| ... | ...               |
| D8 | PROGRAM E          |
| D9 | PROGRAM E          |
| ... | ...               |

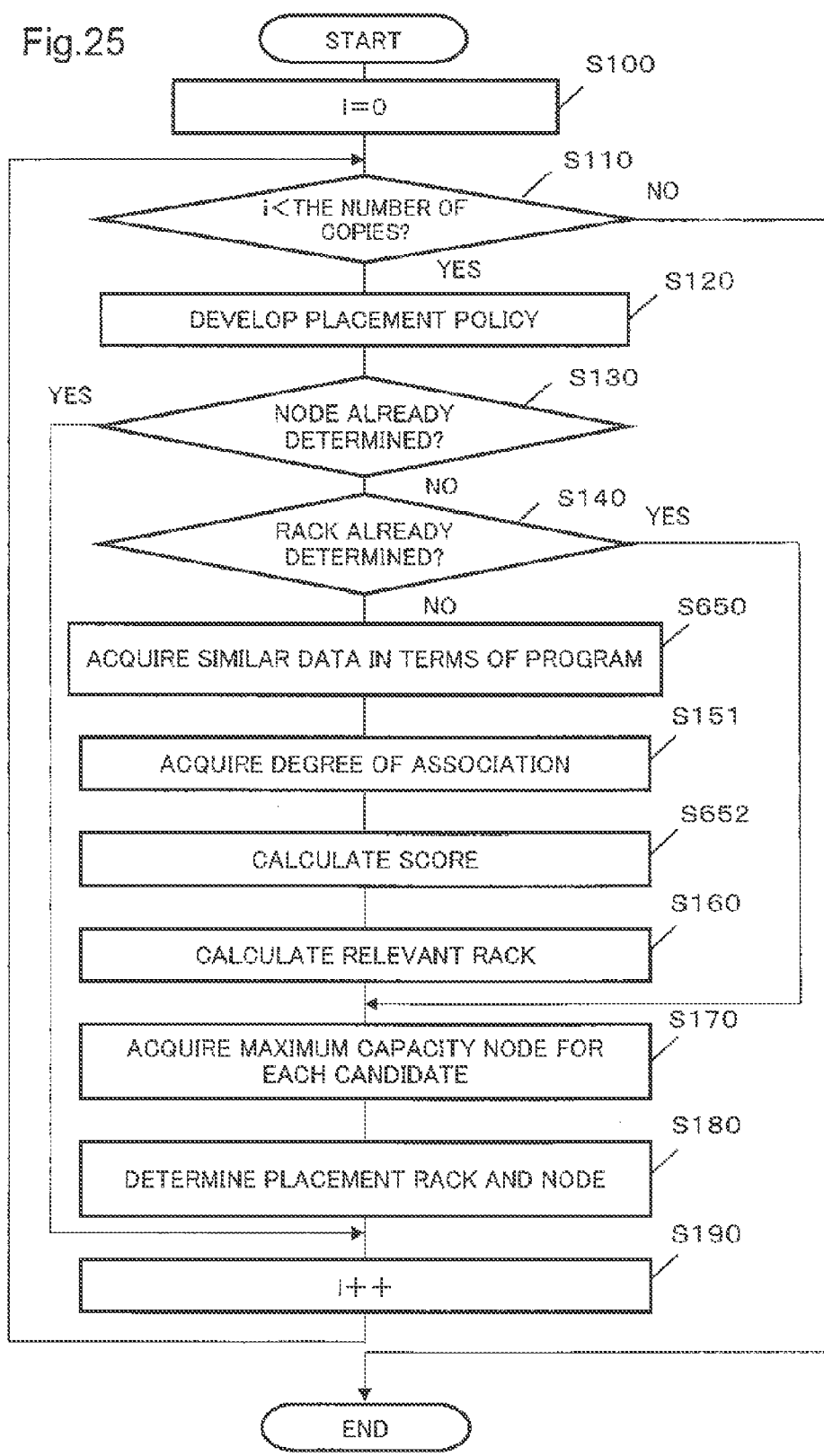

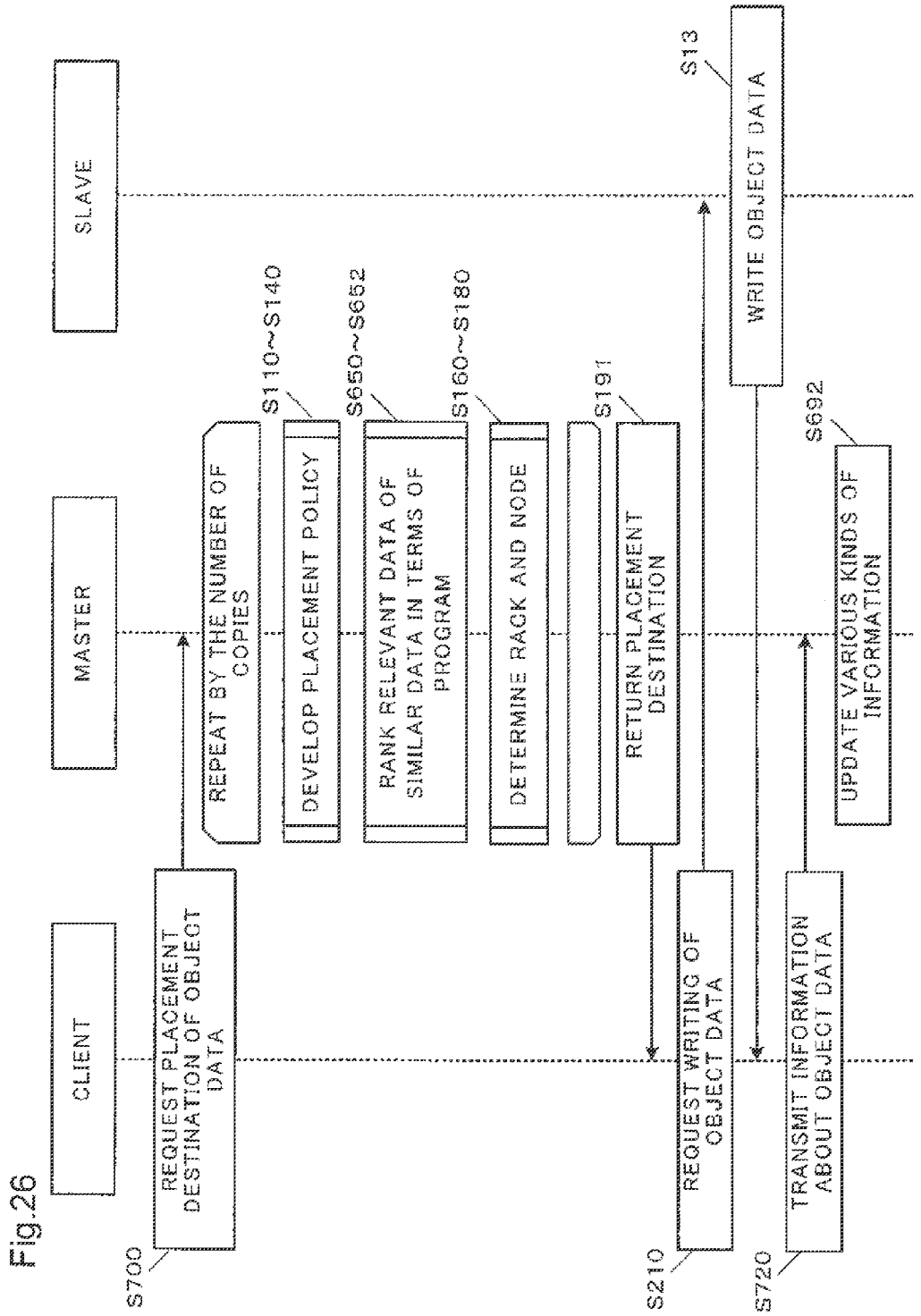

INFORMATION PROCESSING DEVICES, METHOD, AND RECORDING MEDIUM WITH REGARD TO A DISTRIBUTED FILE SYSTEM

CROSS REFERENCE TO RELATED APPLICATIONS

This application is a National Stage of International Application No. PCT/JP2012/054675 filed Feb. 20, 2012, claiming priority based on Japanese Patent Application No. 2011-061045 filed Mar. 18, 2011, the contents of all of which are incorporated herein by reference in their entirety.

TECHNICAL FIELD

The present invention relates to a technical field for determining a placement destination of data in a distributed file system.

BACKGROUND ART

In recent years, a distributed file system which stores data using a plurality of distributed information processing devices is known well along with increase of a volume of data treated by information processing devices. For example, GFS (Google File System) of Google Inc. (here, Google is a registered trademark) and open source HDFS (Hadoop Distributed File System) realize a storage of more than 1 PB (petabyte) capacity by combining a plurality of information processing devices. Such distributed file system can store data that increases on a daily basis such as a web page and log data. Pieces of data to be stored in such distributed file system are efficiently processed in a distributed manner by a distributed processing framework such as MapReduce and Hadoop, respectively.

Such distributed file system is generally equipped with a function to generate a copy of data to be stored (object data). As purposes for making a copy of object data, there are mainly two of them described below.

That is, the first purpose is to secure the fault tolerance of a file system. Because a distributed file system is configured by a plurality of information processing devices, one of the information processing devices may cause a failure. Therefore, a distributed file system creates a copy of object data and stores the copied object data in a different information processing device. As a result, a distributed file system secures a state that the object data is always being backed up. Even when a certain information processing device has a trouble, the object data is not lost as a whole distributed file system because a copy of the object data is stored in a different information processing device.

The second purpose is to mitigate concentration of access to identical data. That is, a distributed file system makes copies of specific object data which is frequently accessed, and stores the copied pieces of the object data in a plurality of information processing devices included in the distributed file system, separately. As a result, even when read requests occur from many programs simultaneously to specific object data, a load of each information processing device constituting a distributed file system can be dispersed. As a result, such distributed file system can provide data access free from a bottleneck.

Here, an example of related technology about determining a placement destination of object data to be stored in such a distributed file system will be described. Hereinafter, it is supposed that information processing devices constituting a distributed file system are stored in racks (server racks) installed in a data center. It is also supposed that a plurality of information processing devices stored in racks are connected so that they can communicate with each other by a communication network (hereinafter, it is abbreviated as "network"). Moreover, it is supposed that, also between a plurality of racks, a plurality of information processing devices which are stored in different racks are connected so that they can communicate with each other by a network. Generally, a band of network communication between a plurality of information processing devices in different racks is narrow compared with that of network communication between respective information processing devices in an identical rack.

For example, such distributed file system reproduces one piece of object data into three pieces of object data (=(one original+(two copies)), first. Then, a distributed file system places first object data in one information processing device stored in a certain rack, places second object data in a different information processing device mounted in the identical rack, and allocates third object data in an information processing device which is mounted in a rack different from the former rack. As a result, the object data is stored using a plurality of racks. Accordingly, even when a failure occurs in one rack, access to the object data is guaranteed. In the example mentioned above, because two racks are used, the cost needed for writing and updating object data is small compared with a case where each of the three pieces of the object data is placed in a different rack separately. Therefore, a distributed file system for determining a placement destination of object data in this way improves performance of writing and updating while maintaining reliability of the object data to be stored.

Also, the technology disclosed in non-patent literature 1 can be applied to such distributed file system as another technology for determining a placement destination of object data. Non-patent literature 1 relates to a technology for reproducing a line of a database. However, when paraphrasing a line into object data in the technology disclosed in non-patent literature 1, the technology is applicable in a distributed file system. A distributed file system to which such technology disclosed in non-patent literature 1 is applied determines placement destinations of a plurality of pieces of copied object data based on relevance between pieces of data. Here, "a plurality of pieces of data having relevance with each other" means pieces of data read by an identical application in identical processing. Henceforth, in the present application, that a plurality of pieces of data are accessed by an identical application in identical processing may be described as "a plurality of pieces of data are used simultaneously." Such distributed file system places a plurality of pieces of data having a high possibility of being used by an identical application simultaneously in an identical rack.

Specifically, a distributed file system to which the technology disclosed in non-patent literature 1 has been applied performs graph partitioning by expressing relevance between pieces of object data which should be stored by a graph. In this graph, data (or a data set which is a set of pieces of data) is represented as a node. In such a graph, relevance between pieces of object data is represented by a side that connects between nodes. Graph partitioning is a known problem of making the number of nodes for each divided graph equal as much as possible, and, at the same time, making the number of sides that cross a divided graph as small as possible. Thus, when the technology disclosed in a non-patent literature 1 is applied, a distributed file system can make determination of a placement destination of object data be boiled down to a graph partitioning problem. Meanwhile, because it is NP-hard (Non-deterministic Polynomial time-Hard) to find the optimal solution of graph partitioning, heuristic or an approximation algorithm is generally applied. As a result, such distributed file system can determine a placement destination of each piece of data so that there may be no partiality in data transmission volumes between racks as much as possible, and relevant data may be placed in an identical node or an identical rack.

In this way, a distributed file system to which the technology disclosed in non-patent literature 1 has been applied can make data transfer associated with processing which uses a plurality of pieces of object data simultaneously be carried out within one rack. As a result, such distributed file system is able to speed up processing which uses a plurality of pieces of object data simultaneously.

In order to express relevance of a plurality of pieces of data that have been copied by a graph, a distributed file system to which the technology disclosed in non-patent literature 1 has been applied needs information representing relevance between each of the copied pieces of data in advance. Such distributed file system acquires information representing relevance between pieces of data based on characteristics of access from outside to the pieces of data having been placed once. Accordingly, a technology which determines a placement destination of object data thus is mainly used in order to change a placement destination appropriately according to access characteristics to data after having placed the data once.

Another technology which acquires such relevance between pieces of data is disclosed in patent literature 1. In the technology disclosed in patent literature 1, a degree of association between documents is acquired based on quotation relation and keyword sharing relation between the documents.

CITATION LIST

Non Patent Literature

[Non Patent Literature 1]
Carlo Curino, Evan Jones, Yang Zhang, Sam Madden, "Schism: a Workload-Driven Approach to Database Replication and Partitioning", Proceedings of the VLDB Endowment, Vol. 3, No. 1

Patent Literature

[Patent Literature 1]
Japanese Patent Application Laid-Open No. 2000-67082

Solution to Problem

However, in the above-mentioned related technologies which reproduces one piece of object data into three pieces and determines their placement destinations, it is also thinkable that there is a case where a plurality of pieces of data used by an application simultaneously are placed in different racks. For this reason, there is a problem that speedup of processing which simultaneously uses a plurality of pieces of data stored in a distributed file system cannot be expected.

In a distributed file system to which the technology disclosed in non-patent literature 1 has been applied, information representing relevance of data will be acquired based on characteristics of access to data after placement of the data having been made once. For this reason, there is a problem that the technology disclosed in non-patent literature 1 cannot determine a placement destination of data to be stored in a distributed file system newly.

Also, in the technology disclosed in patent literature 1, relevance between documents is acquired based on similarity of data contents such as a reference relationship between documents and keyword sharing. However, there is not always similarity in data contents of a plurality of pieces of data having a possibility to be used by an application simultaneously. Accordingly, even if relevance between pieces of data is acquired using the technology disclosed in patent literature 1, and the technology disclosed in non-patent literature 1 is applied to a distributed file system after that, it is difficult to speed up processing which simultaneously uses a plurality of pieces of data that are stored.

The present invention has been made in view of the above-mentioned problems. A main object of the present invention is to provide an information processing device and the like capable of determining a storage location, as a placement destination of object data in a distributed file system, that is most suitable for speeding up future processing which uses a plurality of pieces of data including the object data simultaneously even when the object data is stored newly before use of it.

SUMMARY OF INVENTION

In order to achieve the above-mentioned object, an information processing device according to the present invention is characterized by the following structure.

That is, an information processing device of the present invention includes:

a storage location storage unit to store information representing a storage location of each piece of data stored in a distributed file system;

a generation information storage unit to store generation information about a generating process of the data;

a relevance information storage unit to store relevance information representing relevance between the data and another piece of the data being accessed in identical processing;

a relevant data acquisition unit to acquire the generation information about object data to be an target of determining a placement destination in the distributed file system from the generation information storage unit, acquire, among other pieces of data having been already stored in the distributed file system, similar data similar to the generation information acquired about the object data from the generation information storage unit, and acquire from the relevance information storage unit relevant data having the relevance with the similar data having been acquired;

a placement destination determination unit to determine a storage location to be a placement destination of the object data based on the storage location of the relevant data; and an information update unit to update information stored in the storage location storage unit and the generation information storage unit following storage of the object data to the storage location determined by the placement destination determination unit.

A distributed file system as a different aspect of the present invention includes:

a master device as an information processing device; no smaller than one grouped slave device; a storage location storage unit of the master device storing, as a storage location of the data, information representing the slave device storing the data and a group including the slave device; a relevant data acquisition unit of the master device acquiring the relevant data according to an inquiry about a placement destination of the object data made by an external client device; based on a group including a slave device storing the relevant data, the placement destination determination unit determining a slave device of a placement destination of the object data, and transmitting information representing the determined slave device to the client device as the placement destination; and the slave device storing the object data according to a write request from the client device.

A client device as a further aspect of the present invention includes:

a placement destination requesting unit to make an inquiry about a placement destination of the object data to the master device; a write requesting unit to request writing of the object data to a slave device as a placement destination received from the master device; and a writing completion notification unit to transmit information about the object data to the master device following writing completion of the object data.

A data processing method as a further aspect of the present invention includes:

storing information representing a storage location of each piece of data to be stored in a distributed file system in a first storage device;

storing generation information about a generating process of the data in a second storage device;

storing relevance information representing relevance between the data and another piece of the data being accessed in identical processing in a third storage device;

acquiring the generation information about object data to be an target of determining a placement destination in the distributed file system from a first storage device, and acquiring, among other pieces of data having been already stored in the distributed file system, similar data similar to the generation information acquired about the object data from the second storage device;

acquiring, among other pieces of data having been already stored in the distributed file system, relevant data having the relevance with the similar data from the third storage device;

determining a storage location to be a placement destination of the object data based on the storage location of the relevant data; and updating information stored in the first and second storage devices following storage of the object data to a storage location having been determined.

A data processing method as a further aspect of the present invention includes:

a master device storing information representing a storage location of each piece of data to be stored in a distributed file system in advance, storing generation information about a generating process of the data, and storing relevance information representing relevance between the data and another piece of the data being accessed in identical processing;

a client device making an inquiry about a placement destination of object data to the master device;

the master device acquiring similar data having the generation information similar to the generation information of the object data among other pieces of data having been already stored in the distributed file system by acquiring the generation information on the object data, acquiring relevant data having the relevance with the similar data among other pieces of data having been already stored in the distributed file system, determining a storage location as a placement destination of the object data based on the storage location of the relevant data, and returning a determined storage location to the client device;

the client device requesting storage of the object data to a slave device belonging to the storage location having been returned;

the slave device storing the object data; and the master device adding and storing a storage location and generation information of the object data.

A computer program as a further aspect of the present invention makes a computer execute:

a storage location storage function to store information representing a storage location of each piece of data to be stored in a distributed file system in a first storage device;

a generation information storage function to store generation information about a generating process of the data in a second storage device;

a relevance information storage function to store relevance information representing relevance between the data and another piece of the data being accessed in identical processing in a third storage device;

a similar data acquisition function to acquire the generation information about object data to be an target of determining the placement destination in the distributed file system from the second storage device, and acquiring, among other pieces of data having been already stored in the distributed file system, similar data similar to the generation information acquired about the object data from the second storage device;

a relevant data acquisition function to acquire, among other pieces of data having been already stored in the distributed file system, relevant data having the relevance with the similar data from the third storage device;

a placement destination determination function to determine a storage location to be a placement destination of the object data based on the storage location of the relevant data; and an information updating function to update information stored in the first and second storage devices following storage of the object data to a storage location determined by the placement destination determination function.

The object can be also achieved by an information providing device having the configuration mentioned above, and a computer-readable storage medium in which a computer program for realizing an information providing device or a client device by a computer is stored.

According to the present invention, in a distributed file system, an information processing device and the like which can determine, as an placement destination of object data, a storage location which makes future processing using a plurality of pieces of data including the object data simultaneously faster even when the object data is stored newly can be provided.

BRIEF DESCRIPTION OF DRAWINGS

FIG. 12 is a diagram showing an example of information stored in a generation information storage unit in the second exemplary embodiment of the present invention.

FIG. 13 is a diagram showing an example of information stored in a relevance information storage unit in the second exemplary embodiment of the present invention.

FIG. 15 is a diagram showing an example of information stored in a storage location storage unit in the second exemplary embodiment of the present invention.

FIG. 16 is a diagram showing an example of information stored in a remaining capacity storage unit in the second exemplary embodiment of the present invention.

FIG. 23 is a diagram showing an example of information stored in a generation information storage unit in the third exemplary embodiment of the present invention.

FIG. 25 is a flow chart illustrating operations of a master device in the third exemplary embodiment of the present invention.

FIG. 26 is a sequence diagram illustrating operations of a distributed file system as the third exemplary embodiment of the present invention.

DESCRIPTION OF EMBODIMENTS

Hereinafter, exemplary embodiments of the present invention will be described in detail with reference to a drawing.

First Exemplary Embodiment

Figure 1:
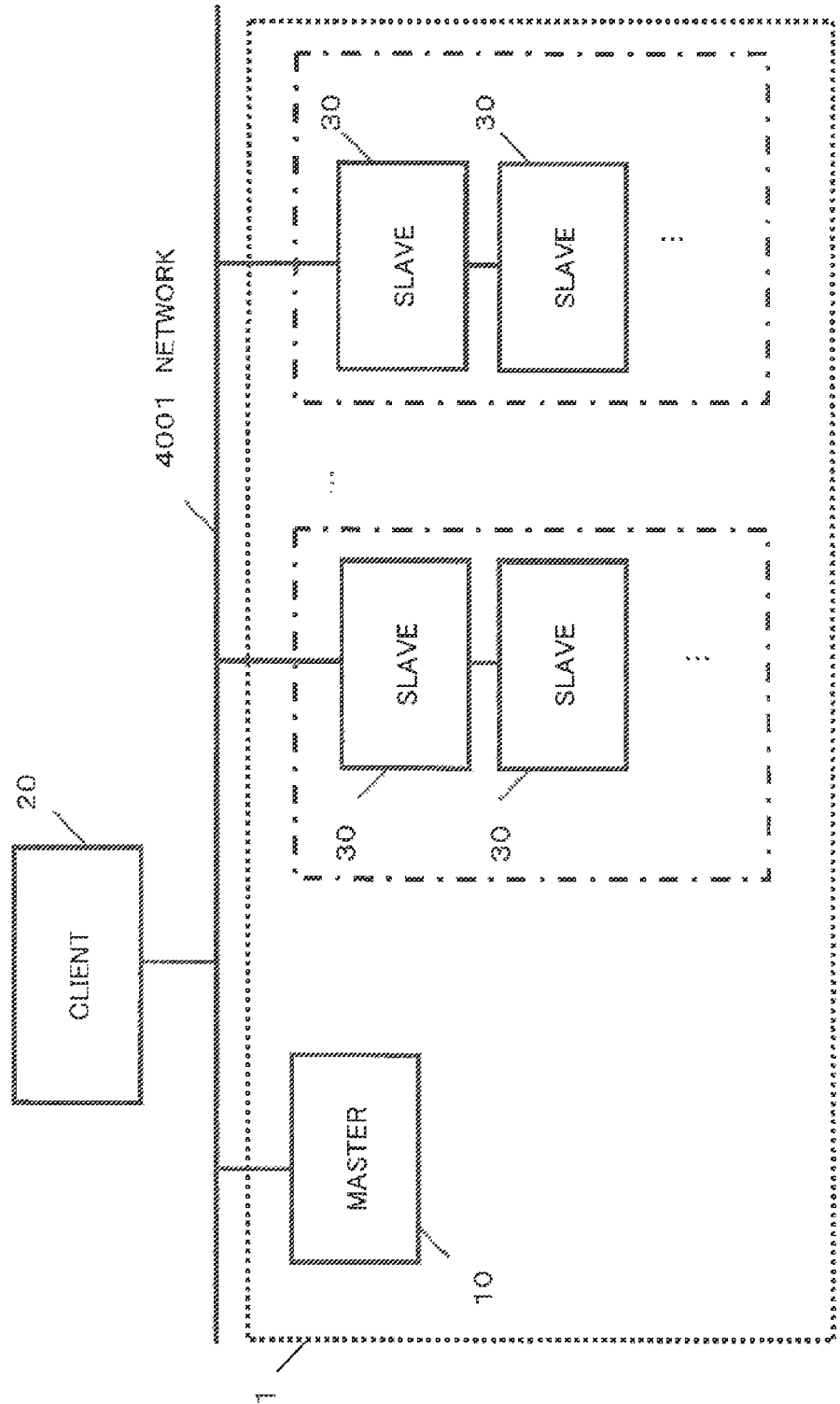
FIG. 1 is a block diagram showing a structure of a distributed file system as a first exemplary embodiment of the present invention.

A structure of a distributed file system 1 as the first exemplary embodiment of the present invention is illustrated in FIG. 1. In FIG. 1, the distributed file system 1 includes a master device (hereinafter, it may just be called "master") 10 and a plurality of pieces of slave device (hereinafter, it may just be called "slave") 30. The master 10 and each slave 30 are connected so as to be able to communicate with each other via a network 4001 including the internet, a LAN (Local Area Network), a public line network, a wireless communication network or combinations of these. The slave 30 is grouped as a block enclosed exemplarily by a dash-and-dot line in FIG. 1. Compared with a communication line with outside of a group, a plurality of pieces of slave 30 constituting an identical group are connected by a network of another system having a wide communication band. For example, when the slave 30 is formed by a server of a rack-mount type, one rack corresponds to one group.

Meanwhile, in FIG. 1, two groups each including two pieces of slave 30 are being illustrated. However, the system configuration illustrated in FIG. 1 does not limit the number of groups and the number of slaves provided in the distributed file system of the present invention.

The distributed file system 1 is connected to the above-mentioned network 4001 so as to be able to communicate with a client device (hereinafter, just referred to as a client as well) 20.

Figure 2:
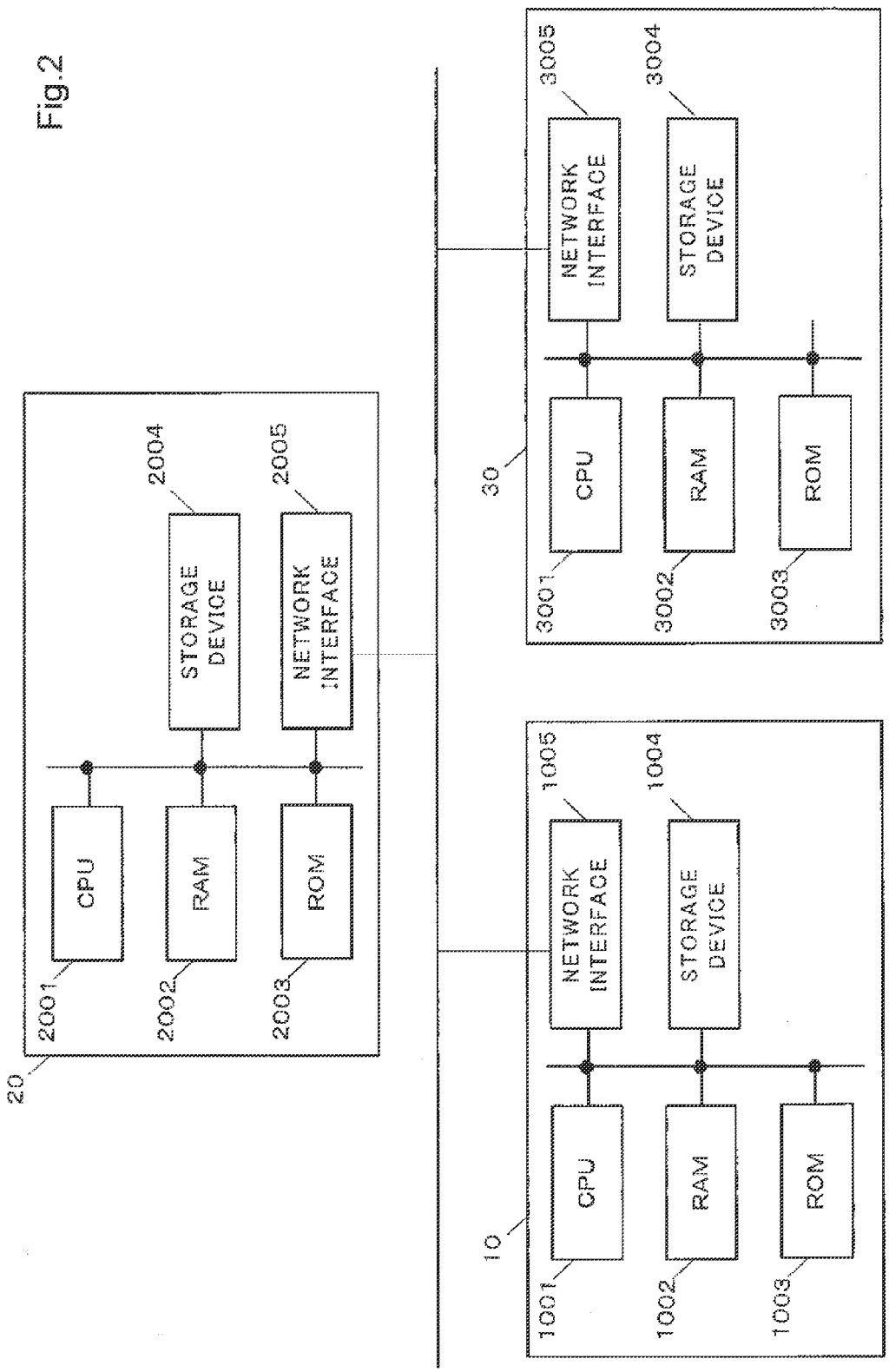
FIG. 2 is a hardware block diagram of each device of which a distributed file system as the first exemplary embodiment of the present invention is composed.

Next, hardware configurations of the master 10, the client 20 and the slave 30 are illustrated in FIG. 2. That is, FIG. 2 indicates an exemplary configuration of hardware resources for executing a software program (computer program) which can realize each function block (processing) which the master 10, the client 20 and the slave 30 mentioned later have.

In FIG. 2, the master 10 is formed by an information processing device equipped with a CPU (Central Processing Unit) 1001, a RAM (Random Access Memory) 1002, a ROM (Read Only Memory) 1003, a storage device 1004 such as a hard disk and a network interface 1005.

The client 20 is formed by an information processing device equipped with a CPU 2001, a RAM 2002, a ROM 2003, a storage device 2004 such as a hard disk and a network interface 2005.

The slave 30 is formed by an information processing device equipped with a CPU 3001, a RAM 3002, a ROM 3003, a storage device 3004 such as a hard disk and a network interface 3005.

Figure 3:
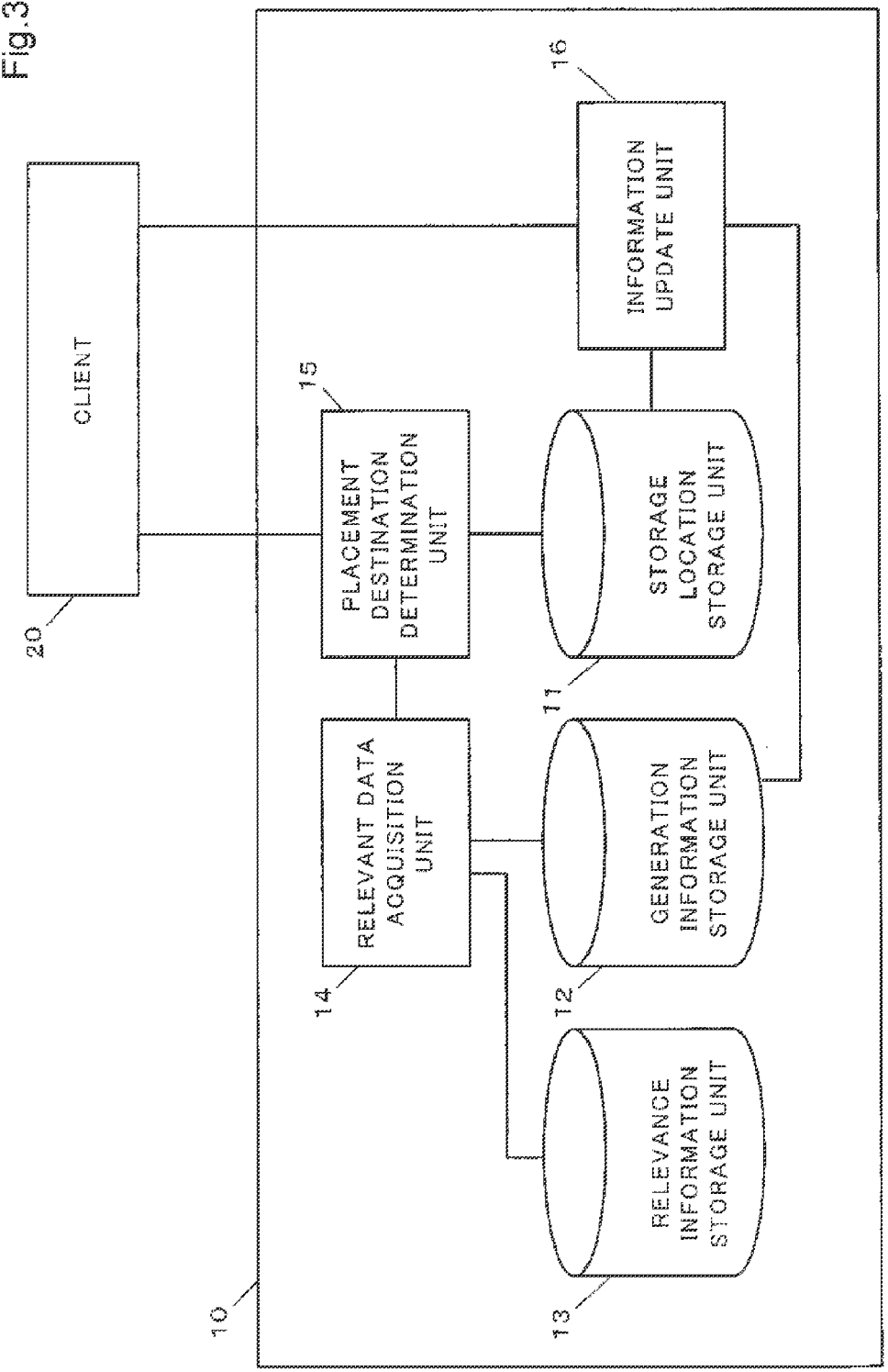
FIG. 3 is a functional block diagram of a master device in the first exemplary embodiment of the present invention.

Next, a function block of the master 10 is illustrated in FIG. 3. In FIG. 3, the master 10 includes a storage location storage unit 11, a generation information storage unit 12, a relevance information storage unit 13, a relevant data acquisition unit 14, a placement destination determination unit 15 and an information update unit 16. Here, the storage location storage unit 11, the generation information storage unit 12 and the relevance information storage unit 13 shown in FIG. 3 functionally are formed using the storage device 1004 in the hardware configuration shown in FIG. 2.

The relevant data acquisition unit 14 is formed by the CPU 1001 that reads a computer program module stored in the storage device 1004 or the ROM 1003 into the RAM 1002, and carries out it. The placement destination determination unit 15 and the information update unit 16 are formed by: the CPU 1001 that read a computer program module stored in the storage device 1004 or the ROM 1003 into the RAM 1002 and carries out it; the network interface 1005 that communicates with the client 20 appropriately during the execution; and the like.

In this regard, however, the present invention is not limited to the hardware configuration of a master device described taking FIG. 3 as an example.

The storage location storage unit 11 stores information representing a storage location of each piece of data to be stored in the distributed file system 1. For example, information representing a storage location may be information which associates information for identifying data with information representing in which slave 30 of which group the data is stored.

The generation information storage unit 12 stores generation information GI about a process in which the data has been generated. Generation information GI may be input data information representing no smaller than one piece of data which has been employed as an input in processing having outputted the data, for example. For example, when data A and data B is read in a certain identical processing, and, as a result, data C is outputted, generation information GI of the data C is expressed in the data A and data B.

Meanwhile, the generation information storage unit 12 may memorize information which has been notified from the client 20 as generation information GI mentioned above. Or, such generation information GI may be information which is acquired by an analysis of a history of data access to the data stored in the distributed file system 1. Such data access history should be accumulated in the master 10. For example, it is supposed that an IP (Internet Protocol) address of the client 20 of an access origin, a process identifier (hereinafter, an identifier may be called "ID"), identification information on accessed data and information representing read or write has been included in a data access history. In this case, in histories between which an IP address and a process identification number are identical, it can be regarded that data that has been read is the generation information GI of data that has been written. Or, a data access history may be information which records a job identifier of a distributed application program instead of an IP address and a process ID. In this way, the generation information storage unit 12 may store the generation information GI acquired by an analysis of data access histories.

The relevance information storage unit 13 stores relevance information which expresses relevance between pieces of data stored in the distributed file system 1 in terms of being accessed in identical processing. Here, relevance information does not represent relevance about the contents of pieces of data, but represents relevance about a piece of data and another piece of data being accessed in identical processing. For example, when data A and data B are read in identical processing, data A and data B have relevance.

Meanwhile, relevance information representing such relevance may be information defined in the outside in advance. Or, such relevance information may be information acquired by analysis of the above-mentioned data access histories. For example, it is possible to assume that there is relevance between pieces of data which have an identical IP address and a process number in data access histories. The relevance information storage unit 13 may be updated according to a periodic analysis of data access histories. Such update of the relevance information storage unit 13 may be carried out by the information update unit 16 mentioned below.

About object data which is a target of determining a placement destination in the distributed file system 1, the relevant data acquisition unit 14 acquires similar data whose generation information GI is similar to the generation information GI of the object data. Then, the relevant data acquisition unit 14 acquires relevant data having relevance mentioned above with the acquired similar data.

Specifically, the relevant data acquisition unit 14 receives from the client 20 an inquiry about a placement destination in the distributed file system 1 of a file to be generated newly by the client 20. Then, the relevant data acquisition unit 14 acquires the generation information GI of that file which is object data. At that time, the relevant data acquisition unit 14 may acquire the generation information GI as well as object data from the client 20. Or, the relevant data acquisition unit 14 may acquire the generation information GI by analyzing data access histories mentioned above.

The relevant data acquisition unit 14 acquires similar data whose generation information GI is similar to the generation information GI of the object data among other pieces of data which have been already stored in the distributed file system 1 based on the generation information storage unit 12. For example, the relevant data acquisition unit 14 may acquire data that has been generated taking data identical with another piece of data which has become an input in the generation processing of the object data as an input as similar data. The relevant data acquisition unit 14 acquires relevant data having relevance with the acquired similar data based on the relevance information storage unit 13.

The placement destination determination unit 15 determines a storage location which is a placement destination of the object data based on a storage location of the relevant data. Specifically, the placement destination determination unit 15 acquires information representing a slave 30 and a group in which the relevant data is stored from the storage location storage unit 11. Then, the placement destination determination unit 15 may determine one of pieces of slave 30 in the acquired group as a placement destination of the object data. The placement destination determination unit 15 transmits information representing the determined slave 30 to the client 20.

Following storage of the object data to the storage location determined by the placement destination determination unit 15, the information update unit 16 updates the storage location storage unit 11 and the generation information storage unit 12. Specifically, the information update unit 16 updates these pieces of information by receiving a writing completion notification including information such as a placement destination, generation information GI and a data size of the object data from the client 20.

The information update unit 16 may update the contents of the relevance information storage unit 13 periodically. For example, the information update unit 16 may update relevance information between pieces of data by analyzing data access histories mentioned above periodically.

Next, each function block of the client 20 will be described with reference to FIG. 4.

Figure 4:
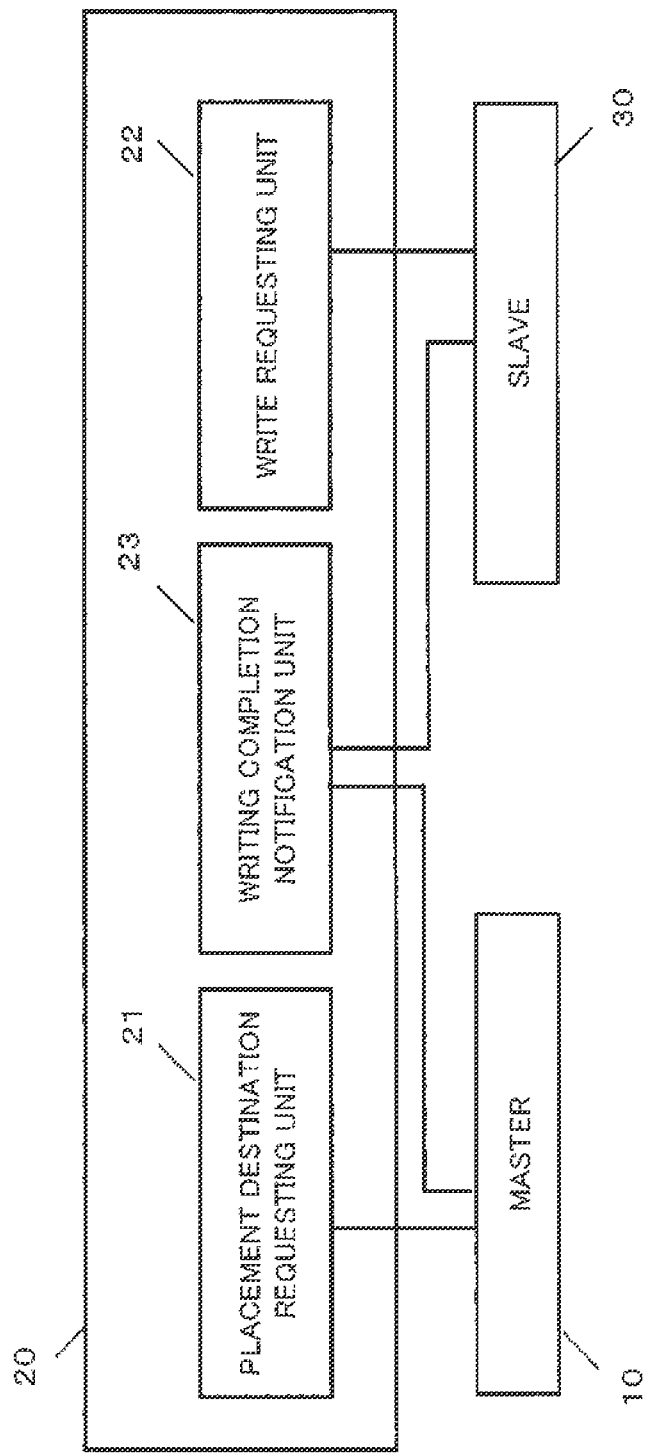
FIG. 4 is a functional block diagram of a client device in the first exemplary embodiment of the present invention.

In FIG. 4, the client 20 includes a placement destination requesting unit 21, a write requesting unit 22 and a writing completion notification unit 23. Here, the placement destination requesting unit 21, the write requesting unit 22 and the writing completion notification unit 23 are formed by such as: the CPU 2001 that reads a computer program module stored in the storage device 2004 or the ROM 2003 into the RAM 2002 to carry out it; and the network interface 2005 that communicates with the master 10 and the slave 30 appropriately during execution.

The placement destination requesting unit 21 makes an inquiry about a placement destination of object data to the master 10. This object data is data which is in the process of being generated newly by the client 20, for example. About object data which is in the process of being generated, a placement destination in the distributed file system 1 has not been decided yet. Accordingly, the placement destination requesting unit 21 makes an inquiry about a placement destination of the object data to the master 10. At that time, the placement destination requesting unit 21 may transmit to the master 10 input data information (generation information GI) which is in the process of being accessed in the processing of generating the object data by including it in placement destination request information for requesting a placement destination. Here, as an example, assume a case where an application which operates on the client 20 reads data A and data B from the distributed file system 1, and, in the process of generating object data C using these pieces of data which have been read, inquires about a placement destination of the object data C. At that time, as generation information GI of the object data C, the placement destination requesting unit 21 may transmit information representing the data A and the data B to the master 10 by including those pieces of information in placement destination request information.

The write requesting unit 22 receives information representing a specific storage location determined by the placement destination determination unit 15 of the distributed file system 1 from the master 10. Then, the write requesting unit 22 transmits a write request of the object data to the slave 30 indicated by the received information.

Following writing completion of the object data to the specific storage location, the writing completion notification unit 23 transmits information about the object data to the master 10. Such information about the object data may be information representing the placement destination of the object data, the size of the object data, the generation information GI of the object data and the like, for example.

Figure 5:
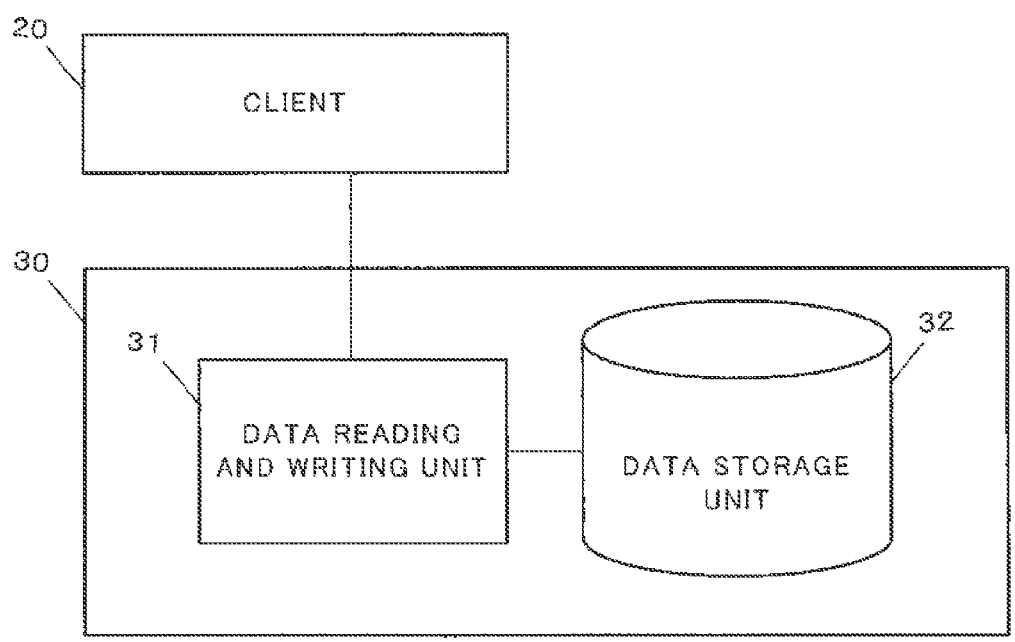
FIG. 5 is a functional block diagram of a slave device in the first exemplary embodiment of the present invention.

Next, a function block of the slave 30 will be described with reference to FIG. 5. In FIG. 5, the slave 30 includes a data reading and writing unit 31 and a data storage unit 32. Here, the data reading and writing unit 31 is formed by: the CPU 3001 that reads a computer program module stored in the storage device 3004 or the ROM 3003 into the RAM 3002 and carries out it; the network interface 3005 that communicates with the client 20 appropriately during execution; and the like. The data storage unit 32 is formed by a memory unit 3004.

According to a write request of data from the client 20, the data reading and writing unit 31 writes the data to the data storage unit 32. According to a reading request of data from the client 20, the data reading and writing unit 31 reads the data from the data storage unit 32. The data storage unit 32 stores data transmitted from the client 20.

Figure 6:
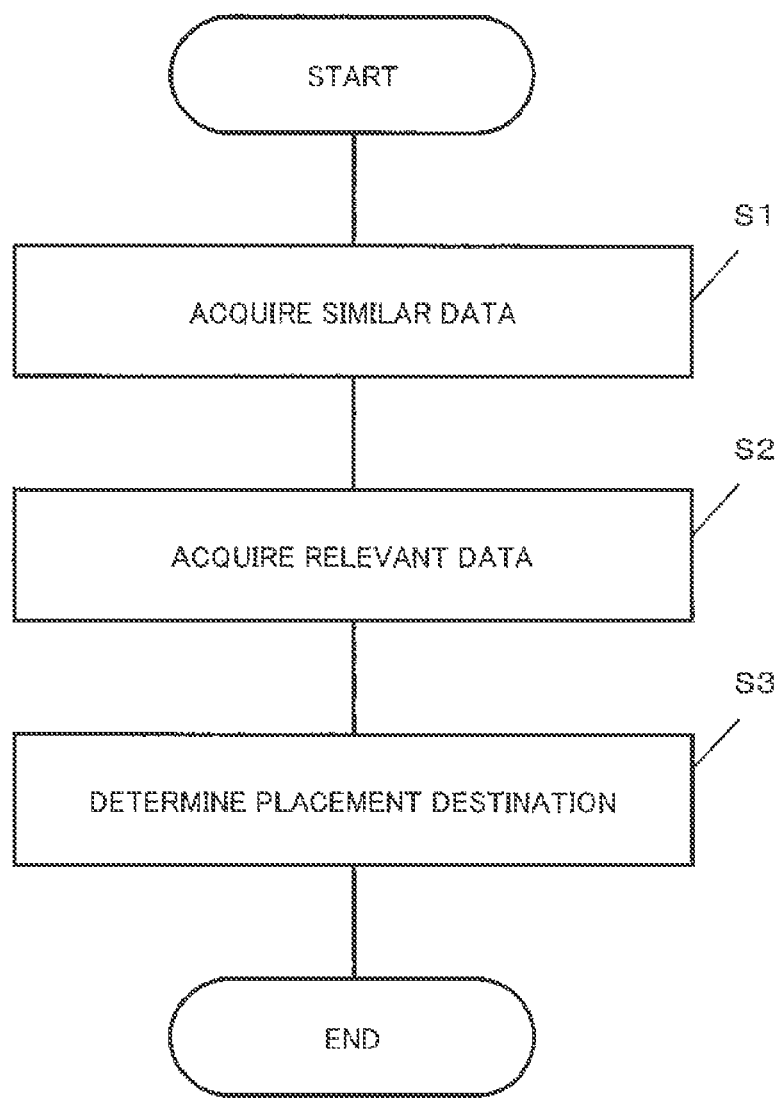
FIG. 6 is a flow chart illustrating an operation of a master device in the first exemplary embodiment of the present invention.
Figure 7:
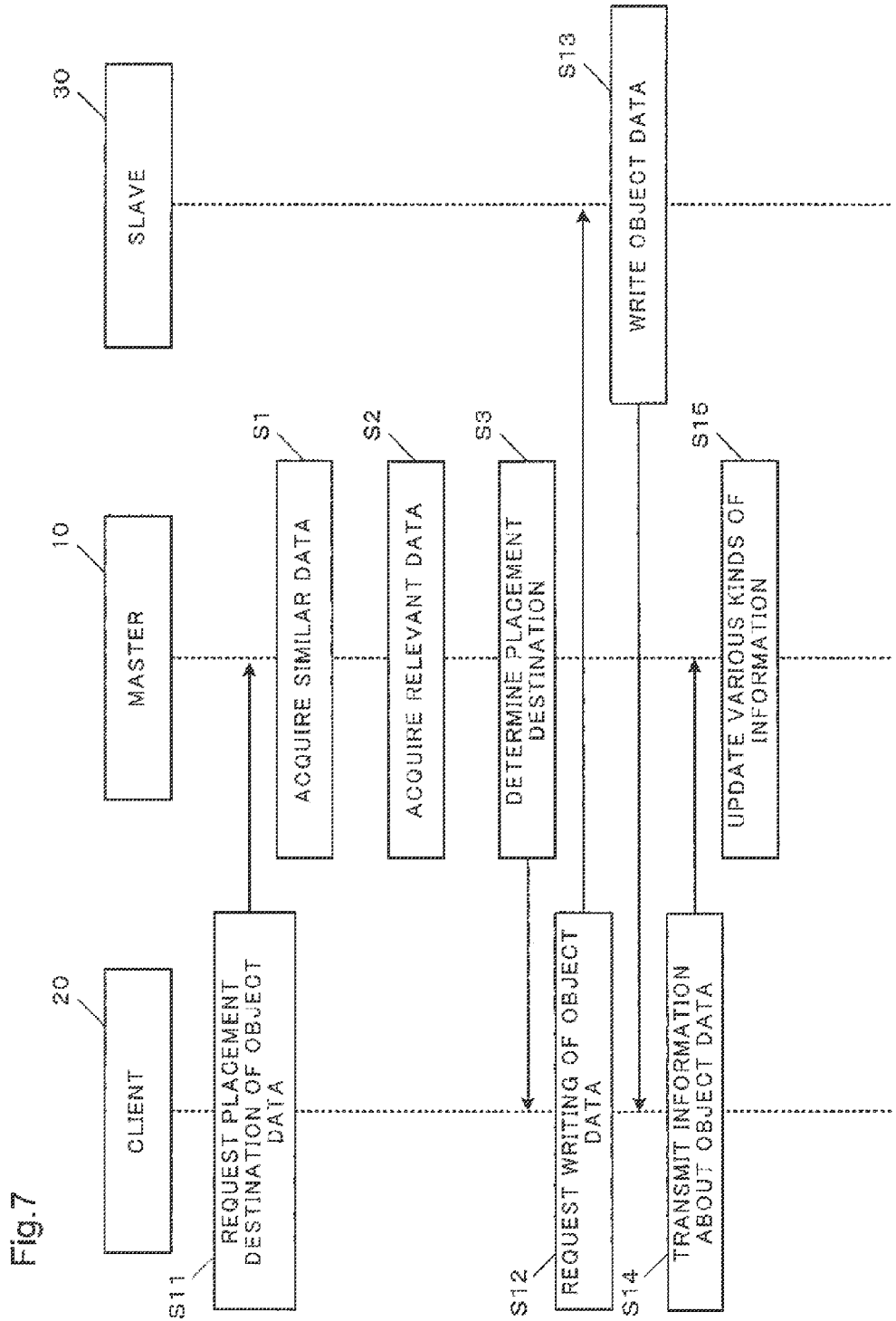
FIG. 7 is a sequence diagram illustrating an operation of a distributed file system as the first exemplary embodiment of the present invention.

Operations of the distributed file system 1 configured as above will be described with reference to FIG. 6 and FIG. 7.

First, an operation in which the master 10 determines a placement destination of object data will be described with reference to the flow chart shown in FIG. 6.

Here, first, the relevant data acquisition unit 14 acquires similar data whose generation information GI is similar to the generation information GI of object data based on the generation information GI of the object data and the generation information storage unit 12 (Step S1).

Next, the relevant data acquisition unit 14 acquires relevant data having relevance with the similar data acquired in Step S1 by referring to the relevance information storage unit 13 (Step S2).

Next, the placement destination determination unit 15 determines a storage location to be a placement destination of the object data based on the storage location of the relevant data acquired in Step S2 (Step S3).

For example, the placement destination determination unit 15 acquires information representing a group in which the slave 30 storing the relevant data is included from the storage location storage unit 11. Then, the group is determined as a placement destination of the object data. The placement destination determination unit 15 determines one of pieces of slave 30 in the group as a placement destination.

By this, the master 10 finishes operating.

Next, operations of the distributed file system 1 when the client 20 stores data in the distributed file system 1 newly will be described with reference to the sequence diagram shown in FIG. 7.

First, the client 20 transmits placement destination request information about object data which is in the process of being generated to the master 10 (Step S11).

At that time, as mentioned above, the client 20 may include the generation information GI of the object data in placement destination request information and transmit it.

Next, the relevant data acquisition unit 14 of the master 10 that has received the placement destination request information acquires similar data that has generation information GI similar to that of the received object data, and acquires relevant data having relevance with the acquired similar data. Then, the placement destination determination unit 15 determines a storage location which will be a placement destination of the object data based on the storage location of the relevant data. (Steps S1-S3) The placement destination determination unit 15 transmits information representing the determined storage location to the client 20.

Next, the write requesting unit 22 of the client 20 that has received the storage location transmits a write request of the object data to the slave 30 represented by the returned information (Step S12).

The data reading and writing unit 31 of the slave 30 that has received the write request stores the object data in the data storage unit 32 (Step S13). Then, the slave 30 notifies the client 20 that writing has been finished.

Next, the writing completion notification unit 23 of the client 20 transmits information about the object data to the master 10 (Step S14).

At that time, as information about the object data, the writing completion notification unit 23 transmits information representing the slave 30 that has stored the object data and the group it belongs, and the generation information GI and the like of the object data to the master 10.

The information update unit 16 of the master 10 that has received the writing completion notification adds the storage location of the object data to the storage location storage unit 11. The information update unit 16 adds the generation information GI of the object data to the generation information storage unit 12.

By this, the distributed file system 1 finishes operating.

Next, the effect of the first exemplary embodiment mentioned above will be described.

A distributed file system and a master device in the first exemplary embodiment can determine a storage location which is more suitable for speeding up of future processing which uses a plurality of pieces of data including the object data simultaneously, even in a case where the object data is stored newly before use of it as a placement destination of the object data.

The reason of this is that: in this exemplary embodiment, the generation information GI of data to be stored in the distributed file system has been stored in the generation information storage unit 12 in advance, and relevance information between pieces of data has been stored in the relevance information storage unit 13 in advance, and the placement destination determination unit 15 acquires relevant data related to similar data whose generation information GI is similar to the generation information GI of the object data, and determines a placement destination of the object data based on the storage location of the relevant data which has been acquired.

As a result, even for data for which another piece of data that has relevance with the former cannot be obtained because the former has no access characteristics in the past like a file generated newly, a distributed file system and a master device in the first exemplary embodiment can identify, by referring to the generation information GI about such data, relevant data that is related to similar data whose generation information GI is similar to the generation information GI of such data. Such relevant data and the object data can be thought that a possibility of being used simultaneously in future processing (that is, of being accessed in identical processing carried out by a client) is high. Accordingly, by placing the object data based on the storage location of the relevant data, a possibility that processing concludes within an identical rack at the time of distributed data processing by MapReduce or the like increases. For this reason, speedup of future processing which uses a plurality of pieces of data including the object data simultaneously can be expected.

Second Exemplary Embodiment

Next, the second exemplary embodiment of the present invention will be described in detail with reference to a drawing. Meanwhile, in each drawing referred to in description of this exemplary embodiment, an identical code is attached to a structure identical with that of the first exemplary embodiment of the present invention and a step which operates similarly to that of the first exemplary embodiment of the present invention, and detailed description in this exemplary embodiment will be omitted.

Figure 8:
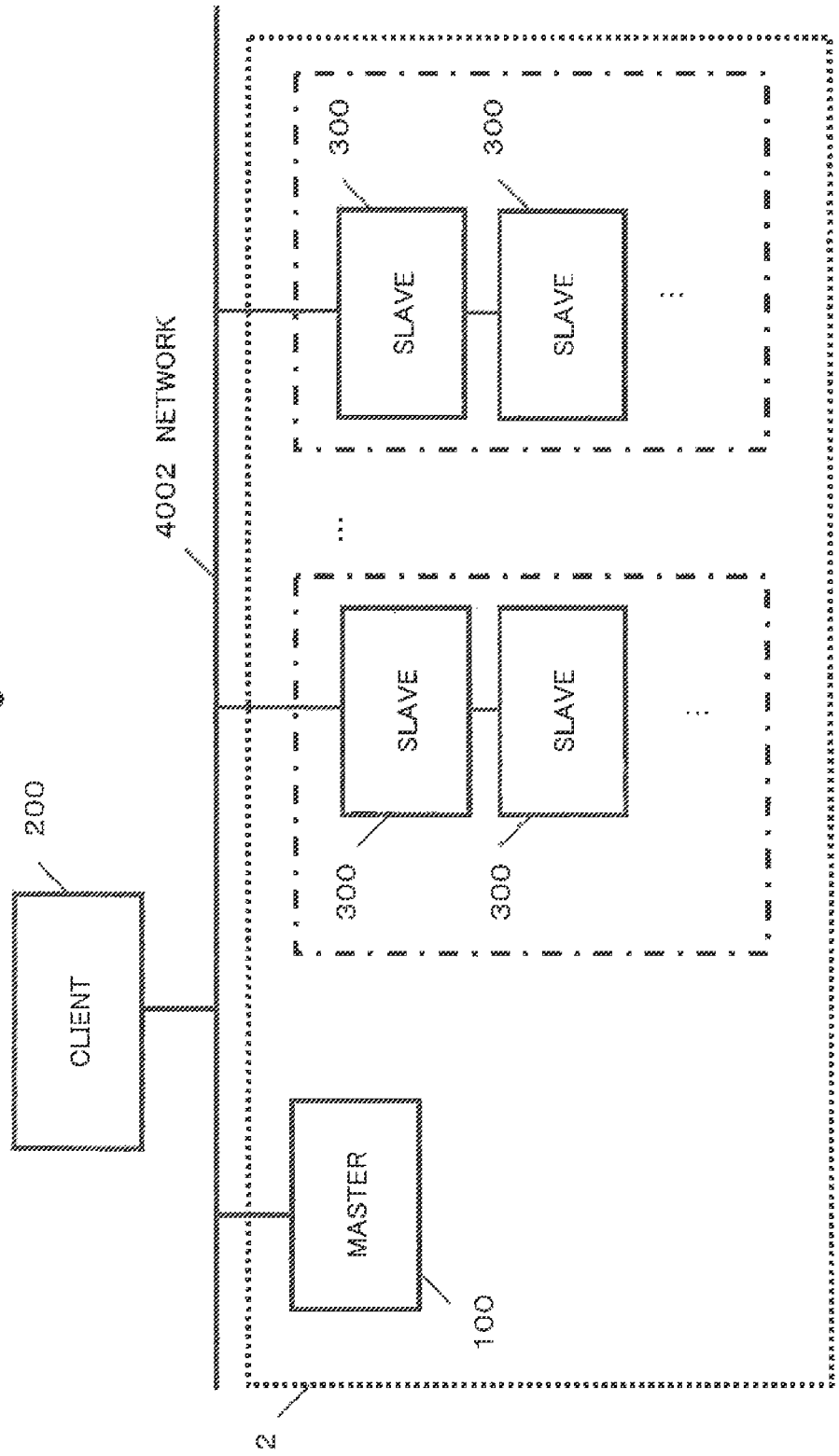
FIG. 8 is a block diagram showing a structure of a distributed file system as a second exemplary embodiment of the present invention.

First, a structure of a distributed file system 2 as the second exemplary embodiment of the present invention is shown in FIG. 8. In FIG. 8, the distributed file system 2 includes a master 100, and a slave 300 grouped by being allocated in no smaller than one rack, respectively. The master 100 and each slave 300 are connected so that they can communicate with each other via a network 4002. Meanwhile, in an exemplary configuration shown in FIG. 8, two pieces of slave 300 allocated in each of two racks are indicated. However, the present invention described taking this exemplary embodiment as an example is not limited to the exemplary configuration in terms of the number of racks and the number of slaves that a distributed file system manages.

The distributed file system 2 is connected to the above-mentioned network 4002 so as to be able to communicate with a client 200.

Figure 9:
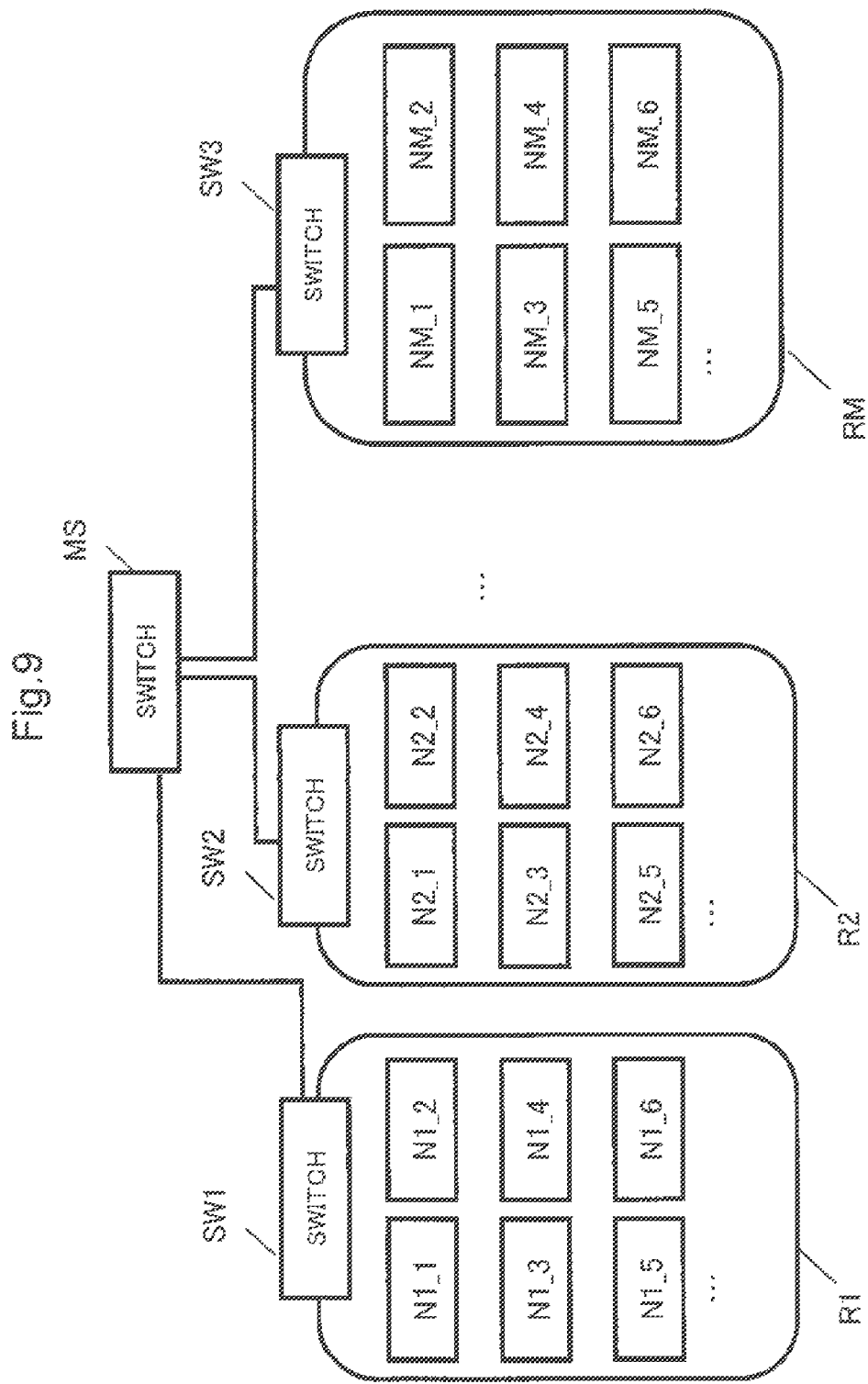
FIG. 9 is a conceptual diagram illustrating a network configuration of a distributed file system as the second exemplary embodiment of the present invention.

In this exemplary embodiment, the master 100 and the slave 300 are connected by the network 4002 that takes a rack as a base unit. For example, as illustrated notionally in FIG. 9, racks R1-RM include the arbitrary number of nodes, respectively. A computer is allocated in respective nodes N1_1-NM_6. Network connection is made between these nodes by a switch in a rack (SW1, SW2, SW3). Between racks, network connection with each other is made by a central switch MS. As a result, between devices placed in optional nodes, it is possible to communicate with each other. In a network configuration which takes such rack an unit, generally, a communication band between different racks is small compared with a communication band between nodes within an identical rack. In a network configuration which takes such rack as an unit, the master 100 is placed in an optional node, and the slave 300 is placed in nodes besides that. The client 200 may be an external node which can be connected to a network which takes such rack as an unit. However, in this exemplary embodiment, description will be made supposing that the client 200 is placed in an optional node of one rack managed by the distributed file system 2.

Because the hardware configurations of the master 100, the client 200 and the slave 300 are similar to those of the master 10, the client 20 and the slave 30 as the first exemplary embodiment of the present invention described with reference to FIG. 2, description in this exemplary embodiment will be omitted.

Figure 10:
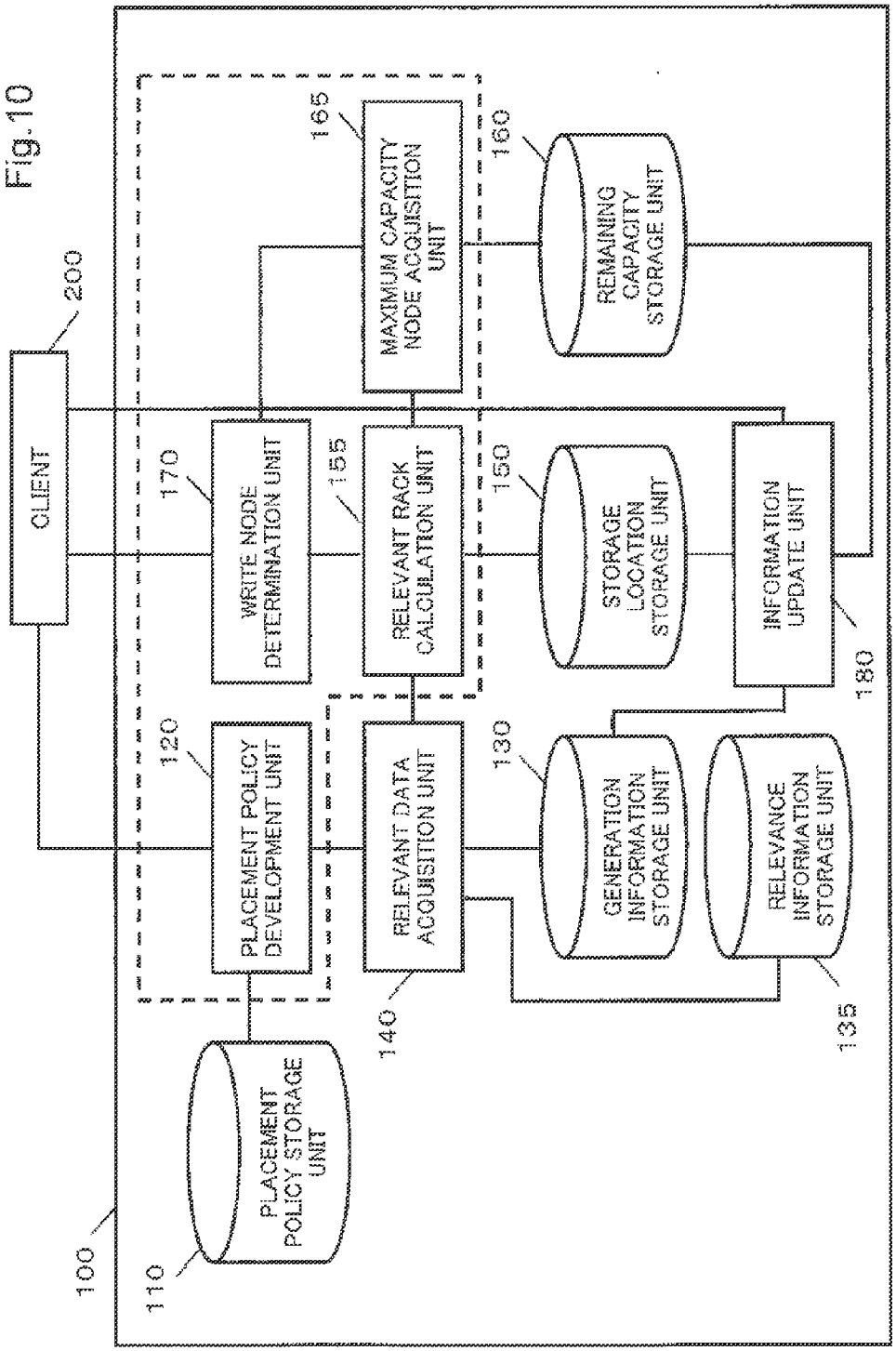
FIG. 10 is a functional block diagram of a master device in the second exemplary embodiment of the present invention.

Next, a function block of the master 100 will be described with reference to FIG. 10. In FIG. 10, the master 100 includes a placement policy storage unit 110, a placement policy development unit 120, a generation information storage unit 130, a relevance information storage unit 135, a relevant data acquisition unit 140, a storage location storage unit 150, a remaining capacity storage unit 160, a relevant rack calculation unit 155, a maximum capacity node acquisition unit 165 and a write node determination unit 170.

Here, the placement policy storage unit 110, the generation information storage unit 130, the relevance information storage unit 135, the storage location storage unit 150 and the remaining capacity storage unit 160 are formed by the storage device 1004. The placement policy development unit 120, the write node determination unit 170 and an information update unit 180 are formed by: the CPU 1001 that reads a computer program module stored in the storage device 1004 or the ROM 1003 into the RAM 1002 and carries out it; the network interface 1005 that communicates with the client 200 appropriately during execution; and the like. The relevant data acquisition unit 140, the relevant rack calculation unit 155 and the maximum capacity node acquisition unit 165 are formed by the CPU 1001 that reads a computer program module stored in the storage device 1004 or the ROM 1003 into the RAM 1002 and carries out it Meanwhile, the placement policy development unit 120, the relevant rack calculation unit 155, the maximum capacity node acquisition unit 165 and the write node determination unit 170 configures one exemplary embodiment of the placement destination determination unit 15 in the first exemplary embodiment of the present invention.

The placement policy storage unit 110 stores a placement policy representing a condition about placement destinations of each of a plurality of identical pieces of object data obtained by copying the object data. For example, a placement policy may be described by the following notation (description rule).

<Example of Notation of a Placement Policy>

Policy:=P_<No>PlaceToStore,

PlaceToStore:=Rack.Node, where, P_<No> indicates a policy number. <No> is a numerical value representing an order of applying a policy. Rack.Node represents information for identifying a rack and information for identifying a node in the rack. In this exemplary embodiment, a placement destination of each of a plurality of pieces of identical object data obtained by copying the object data is determined from placement destinations that meet such placement policy. An example of a designation method of a rack and a designation method of a node based on the above-mentioned notation is indicated below.

<Example of Notation about Rack Designation>

R_<n>: The rack of an identification number n

R_cur: The rack including a node in which the client 200 is placed

R_P<n>: A rack determined by policy n

~R: A rack besides rack R

*: An optional rack

<Example of Notation about Node Designation>

N_<n>: The node of identification number n (it can be designated when a rack is expressed in R_<n>)

N_cur: A node in which the client 200 has been placed (it can be designated when a rack is represented in R_cur)

N_P<n>: A node determined by policy n (it can be designated only when a rack is R_P<n>)

~N: Nodes besides node N

*: An optional node

An example of a placement policy using such notation will be indicated next.

<Example of a Placement Policy>

Policy P1: P1 R_cur.*,

Policy P2: P2~R_P1.*, where, a policy P1 represents the first object data among a plurality of identical pieces of object data, and, at the same time, represents placing the first object data in an optional node in the rack including an node in which the client 200 has been placed.

A policy P2 represents the second object data among a plurality of identical pieces of object data, and represents placing this second object data in an optional node in a rack besides the rack represented by the above-mentioned policy P1.

Meanwhile, the placement policy storage unit 110 may memorize a placement policy based on such notation and also a placement policy by different notation.

The placement policy development unit 120 takes out one policy from the placement policy storage unit 110 one by one, and develops a notation part about rack designation which is included in a policy which has been taken out into a rack corresponding to the rack designation. The policy development unit 120 develops a notation part about node designation into a node corresponding to the node designation after having determined a rack.

Meanwhile, the placement policy development unit 120 may acquire information representing a rack and a node in which the client 200 is placed from the client 200. Or, the policy development unit 120 may acquire information representing a rack and a node in which the client 200 is placed by comparing a network address of each node being stored in the master 100 in advance and the address of the client 200.

Figure 11:
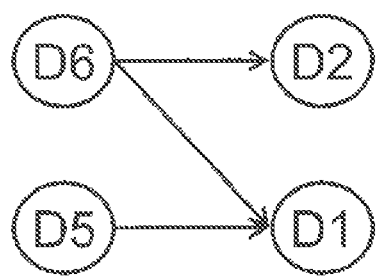
FIG. 11 is a conceptual diagram illustrating a process of generation of data in the second exemplary embodiment of the present invention.

Targeting each of pieces of data which has been already stored in the distributed file system 2, the generation information storage unit 130 stores input data information representing other data which has become an input in processing which has outputted each of the pieces of data as the generation information GI. Here, for example, assume input/output relation of pieces of data as illustrated in FIG. 11. The input/output relation illustrated in FIG. 11 represents that data D1 has been generated in processing which has taken data D5 and data D6 as an input. FIG. 11 also represents that data D2 has been generated in processing which has taken data D6 as an input.

An example of information stored in the generation information storage unit 130 in the case shown in FIG. 11 is shown in FIG. 12. In FIG. 12, the generation information GI of each piece of data is expressed in each line. The generation information GI of each piece of data is represented as a feature vector which expresses other pieces of data that have been read in the generation processing by 1 and a feature vector which expresses pieces of data besides that by 0. Meanwhile, the generation information storage unit 130 may memorize generation information GI represented by another form in addition to the form shown in FIG. 12.

As relevance information representing relevance between pieces of data which have been already stored in the distributed file system 2 according to the second exemplary embodiment, the relevance information storage unit 135 stores an association degree that represents a degree of relevance. Here, that there is relevance between a plurality of pieces of data indicates that, as is the case with the first exemplary embodiment mentioned above, they are accessed in identical processing carried out by the client 200 (that is, they are used simultaneously). A degree of association between pieces of data used simultaneously in various kinds of processing becomes large.

The relevance information storage unit 135 may memorize a degree of association defined in the outside in advance. The relevance information storage unit 135 may memorize a degree of association that is calculated based on data access histories accumulated in the master 100.

Figure 13:
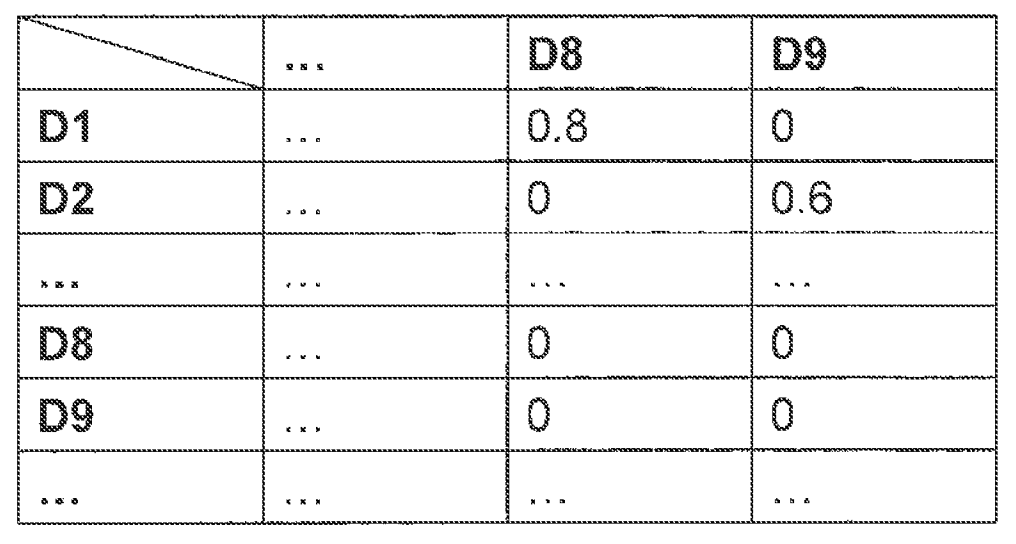

An example of information which the relevance information storage unit 135 stores is shown in FIG. 13. In FIG. 13, the first row expresses the degree of association between data D1 and other pieces of data. When paying attention to the first row more specifically, the degree of association between data D1 and data D8 is 0.8 in this example. Similarly, when paying attention to data D2 of the second row, the degree of association between data D2 and data D9 is 0.6.

Meanwhile, for example, it is supposed that the IP address of the client 200, a process ID and identification information of data having been accessed is included in a data access history. In this case, a degree of association between data D1 and data D8 may be a numerical value which is made by dividing the number of accesses having both of an identical IP address and an identical process ID with each other among accesses to data D1 and data D8 in data access histories by a predetermined denominator. Such data access history may include not only an IP address and a process ID but also a job ID of a distributed application program. Meanwhile, the relevance information storage unit 135 may memorize relevance information expressed by other forms in addition to the form shown in FIG. 13.

The relevant data acquisition unit 140 calculates a score about each pieces of relevant data having relevance with similar data whose generation information GI is similar to the generation information GI of the object data. This score represents a degree of possibility that relevant data is used simultaneously with the object data. Meanwhile, when a rack and a node developed by the placement policy development unit 120 have not been determined uniquely, the relevant data acquisition unit 140 calculates scores of these pieces of relevant data. For example, the relevant data acquisition unit 140 may calculate a similarity degree by the cosine distance between a feature vector representing the generation information GI of the object data and a feature vector representing the generation information GI of another piece of data stored in the generation information storage unit 130.

Then, the relevant data acquisition unit 140 acquires the degree of association between the similar data for which a similarity degree has been calculated and relevant data from the relevance information storage unit 135. The relevant data acquisition unit 140 calculates a score of the relevant data based on the similarity degree of the similar data and the degree of association of the relevant data. For example, the relevant data acquisition unit 140 may calculate the score of the relevant data by finding the product of the similarity degree and the degree of association.

Figure 14:
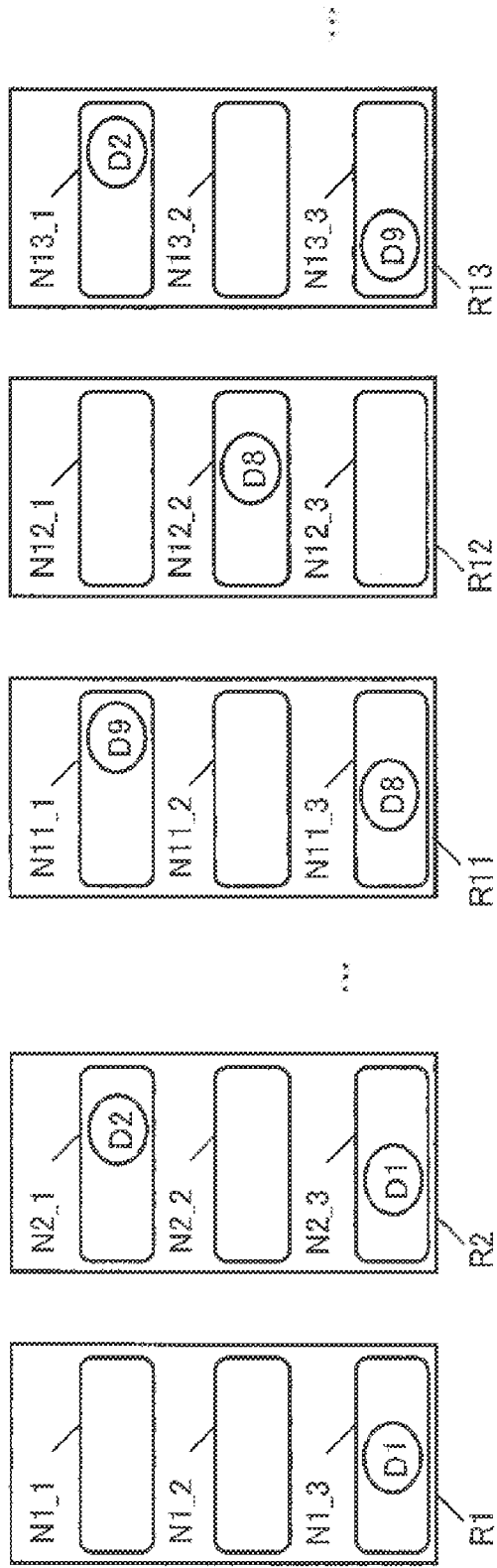
FIG. 14 is a diagram showing an example of a storage location of each piece of data stored in a distributed file system as the second exemplary embodiment of the present invention.

As a storage location of each piece of data which the distributed file system 2 stores, the storage location storage unit 150 stores information representing a rack and a node in which a slave 300 to store each piece of data has been placed. For example, as shown in FIG. 14, assume that data D1, D2, D8 and D9 are stored in a slave 300 placed in a node of each rack. In this case, an example of information stored in the storage location storage unit 150 is shown in FIG. 15. For example, FIG. 15 represents that data D2 is stored in node N2_1 of rack R2 and node N13_1 of rack R13. Meanwhile, the storage location storage unit 150 may memorize a storage location represented by other forms in addition to the form shown in FIG. 15.

The relevant rack calculation unit 155 calculates a storage location score for ranking a rack in which relevant data is being stored (hereinafter, also referred to as a relevant rack) using the score of the relevant data calculated in the relevant data acquisition unit 140 and information of the storage location storage unit 150. Specifically, the relevant rack calculation unit 155 identifies a relevant rack in which each piece of relevant data whose score has been calculated is stored by the relevant data acquisition unit 140. A storage location score of the relevant rack is calculated based on the score of the relevant data included in the identified relevant rack.

Here, when a plurality of pieces of relevant data are stored in an identical relevant rack, the relevant rack calculation unit 155 calculates a storage location score of the relevant rack based on respective scores of a plurality of pieces of relevant data. For example, the relevant rack calculation unit 155 may calculate the summation of each score of pieces of relevant data included in an identical relevant rack as a storage location score of the relevant rack.

The remaining capacity storage unit 160 stores information representing a remaining storage capacity which each slave 300 included in the distributed file system 2 can use for storage. An example of information stored in the remaining capacity storage unit 160 is shown in FIG. 16. FIG. 16 represents that the remaining storage capacity of node N1_2 of rack R1 is 80 GB (gigabyte), for example. Meanwhile, the remaining capacity storage unit 160 may memorize a remaining storage capacity represented by other forms in addition to the form shown in FIG. 16.

The maximum capacity node acquisition unit 165 selects a node with the largest remaining storage capacity for each relevant rack based on a storage location score of a relevant rack calculated by the relevant rack calculation unit 155 and the remaining capacity storage unit 160. Meanwhile, the maximum capacity node acquisition unit 165 may select not only a node of the biggest remaining storage capacity but also an optional node having a remaining storage capacity not less than a threshold value.

The write node determination unit 170 determines a rack and a node which will be a placement destination of the object data using a storage location score of a relevant rack obtained by the relevant rack calculation unit 155 and information on a node which has been obtained by the maximum capacity node acquisition unit 165. Then, the write node determination unit 170 transmits information on the determined rack and node to the client 200.

Thus, the placement destination determination unit 15 in this exemplary embodiment including the placement policy development unit 120, the relevant rack calculation unit 155, the remaining capacity storage unit 160 and the write node determination unit 170 mentioned above determines placement destinations of a predetermined number of copies of object data based on a placement policy and a storage location of relevant data.

Following the completion of writing of the object data, the information update unit 180 updates various kinds of information which the master 100 stores. Specifically, the information update unit 180 adds the generation information GI of the object data having been stored newly to the generation information storage unit 130. The information update unit 180 adds the storage location of the object data having been stored newly to the storage location storage unit 150. In the remaining capacity storage unit 160, the information update unit 180 updates the remaining storage capacity of the node which has stored the object data newly. Meanwhile, the information update unit 180 performs these information updates by receiving the generation information GI of the object data, the storage location and the notification of writing completion including a data size from the client 200.

Figure 17:
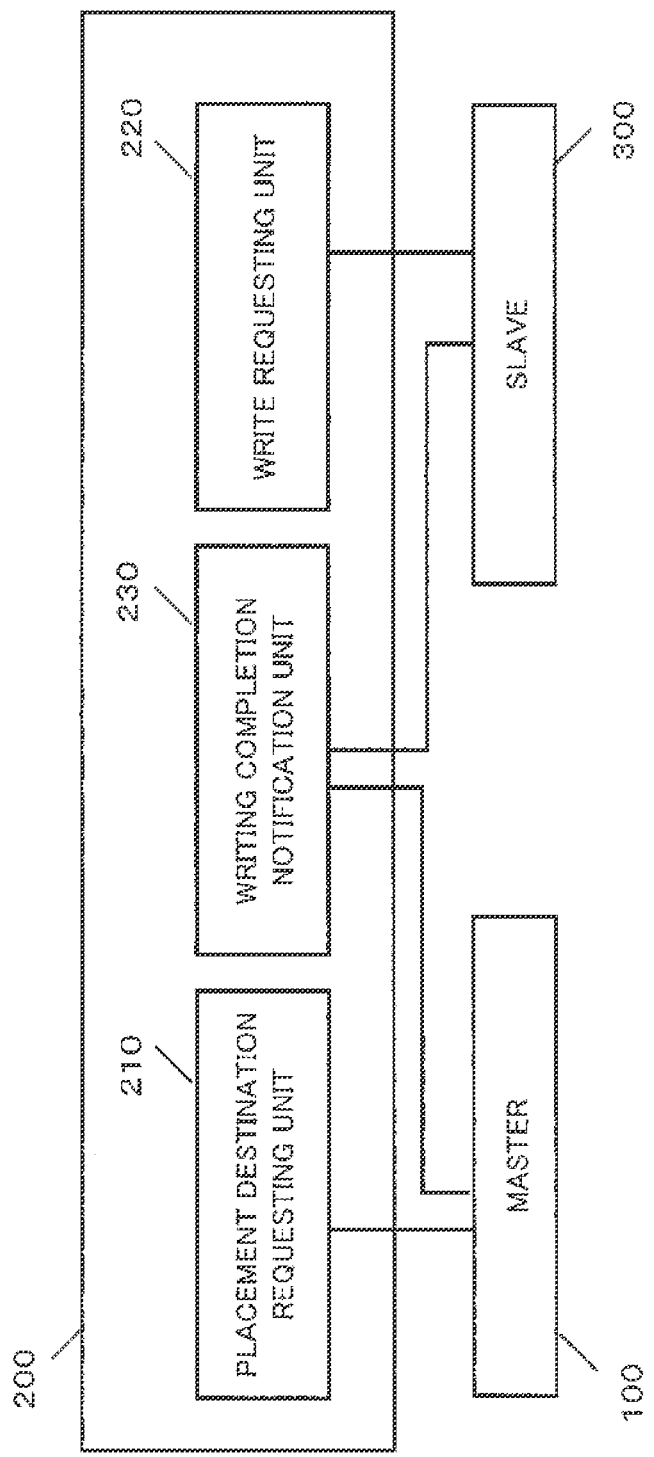
FIG. 17 is a functional block diagram of a client device in the second exemplary embodiment of the present invention.

Next, a function block structure of the client 200 will be described with reference to FIG. 17. In FIG. 17, the client 200 includes a placement destination requesting unit 210, a write requesting unit 220 and a writing completion notification unit 230.

Regarding object data which is in the process of being generated in processing which the client 200 is carrying out, the placement destination requesting unit 210 make an inquiry about its placement destination in the distributed file system 2 to the master 100. Specifically, the placement destination requesting unit 210 transmits input data information representing another piece of data which is being accessed in the processing of generating the object data (the generation information GI of the object data) to the master 100 by including it in placement destination request information. Then, the placement destination requesting unit 210 receives information representing placement destinations of a predetermined number of copies from the master 100.

The write requesting unit 220 requests writing of the object data to a slave 300 that is each of the placement destinations having been received by the placement destination requesting unit 210. At that time, the write requesting unit 220 may request writing by transmitting the object data to each slave 300 of the placement destinations, respectively. Or, the write requesting unit 220 may transmit information representing the object data and the respective placement destinations to one of the pieces of slave 300 of the placement destinations. In this case, the slave 300 that has received the object data may store the object data, and transmit the object data and the information representing the remaining placement destinations to one of pieces of slave 300 that are the remaining placement destinations. Thus, storing of the object data may be performed by transmitting data in a bucket relay manner.

Following writing completion of the object data, the writing completion notification unit 230 transmits information about the object data to the master 100. At that time, as information about the object data, the writing completion notification unit 230 may transmit the identification information of the object data, its data size, the information on the rack and the node of its placement destination and its generation information GI. Meanwhile, instead of the writing completion notification unit 230 transmitting the information about the object data to the master 100, the slave 300 may transmit a writing completion notification including these pieces of information to the master 100. In this case, for example, the slave 300 should simply transmit information being held about the object data to the master 100 at timing after data writing.

Figure 18:
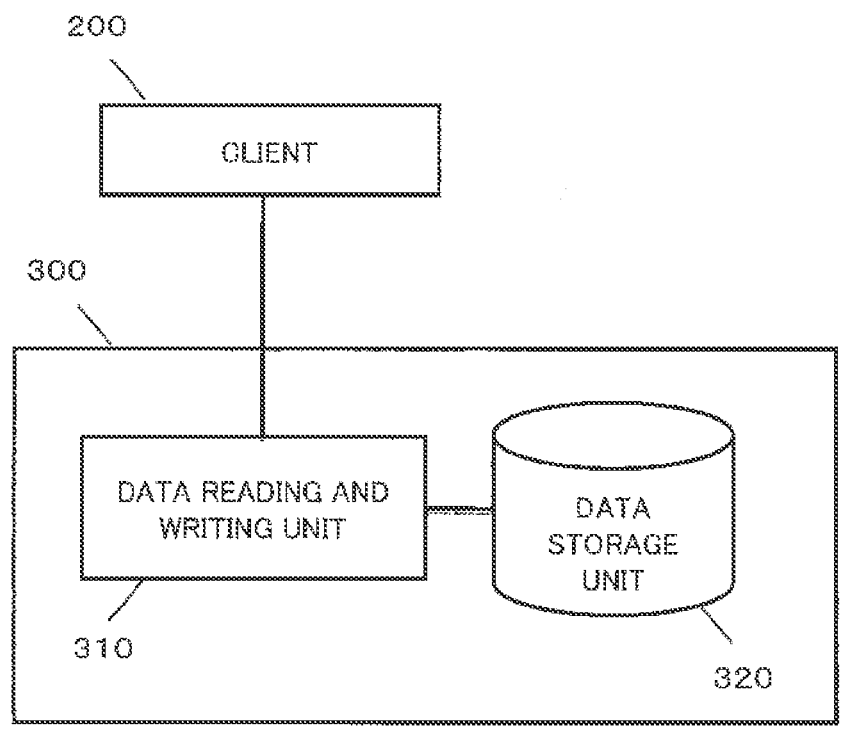
FIG. 18 is a functional block diagram of a slave device in the second exemplary embodiment of the present invention.

Next, a function block structure of the slave 300 will be described with reference to FIG. 18. In FIG. 18, the slave 300 includes a data reading and writing unit 310 and a data storage unit 320.

The data reading and writing unit 310 writes data to the data storage unit 320 in response to a write request of the data from the client 200. The data reading and writing unit 310 reads data from the data storage unit 320 in response to a read request of the data from the client 200. The data storage unit 320 stores data transmitted from the client 200.

Operations of the distributed file system 2 constituted like the above will be described with reference to a drawing.

First, operations in which the master 100 determines a placement destination of object data will be described with reference to FIG. 19. Meanwhile, it is supposed that the generation information GI and relevance information of each piece of data which has been already stored in the distributed file system 2 have been stored in the generation information storage unit 130 and the relevance information storage unit 135. It is supposed that, in the distributed file system 2, the number of copies when storing a copy of each piece of data has been set in advance.

Figure 19:
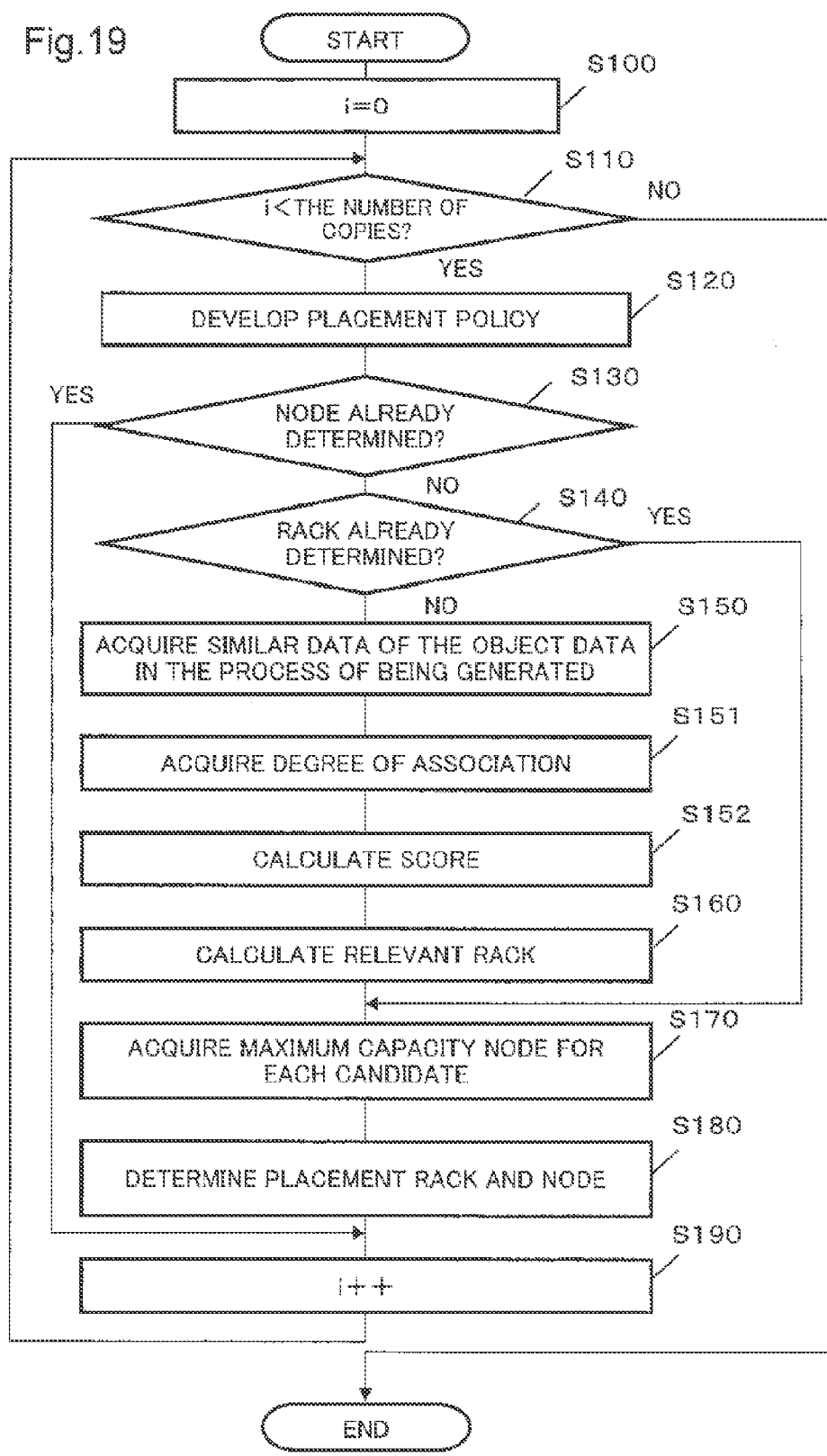
FIG. 19 is a flow chart illustrating operations of a master device in the second exemplary embodiment of the present invention.

When placement destination request information for the object data is received from the client 200, the master 100 begins an operation of each step indicated in the flow chart shown in FIG. 19. At that time, it is supposed that input data information (the generation information GI) of the object data is included in the placement destination request information.

Here, first, the write node determination unit 170 initializes a counter variable i to 0 (Step S100). Next, the write node determination unit 170 determines whether the counter variable i is smaller than the number of copies that has been determined in advance or not (Step S110).

Here, when the counter variable i is no smaller than the number of copies, the write node determination unit 170 transmits information representing each of placement destinations to the client 200 and finishes operating because the placement destinations corresponding to the number of copies have been already determined.

On the other hand, when the counter variable i is smaller than the number of copies, the placement policy development unit 120 acquires one placement policy from the placement policy storage unit 110, and performs development of it (Step S120).

At that time, the placement policy development unit 120 acquires information on the node and the rack in which the client 200 is placed using information on a rack corresponding to the IP address of each node, the information having been stored in the master 100 in advance.

Next, the write node determination unit 170 judges whether, in the developed placement policy, a node has been already fixed uniquely (Step S130).

Here, when judging that a node has been already fixed, the operations of the master 100 advances to Step S190, the counter variable i is incremented and the processing from Step S110 is repeated once again.

On the other hand, when judging that a node is not fixed in Step S130, the relevant rack calculation unit 155 judges whether, in the developed placement policy, a rack has been already fixed uniquely (Step S140).

Here, when judging that a rack has been already fixed, the operations of the master 100 advances to Step S170.

On the other hand, when judging that a rack has not been already fixed in Step S140, the relevant rack calculation unit 155 calculates a similarity degree of similar data of the object data based on the generation information storage unit 130 (Step S150).

For example, the relevant rack calculation unit 155 calculates a cosine distance between the generation information GI of the object data included in the placement destination request information and the generation information GI of each piece of data which has been already stored in the distributed file system 2 as a similarity degree. At that time, the relevant rack calculation unit 155 may make a piece of data for which a similarity degree no smaller than a threshold value has been calculated be a piece of similar data.

Next, the relevant rack calculation unit 155 acquires a degree of association of relevant data having relevance with a piece of similar data for which a similarity degree has been calculated from the relevance information storage unit 135 (Step S151).

At that time, the relevant rack calculation unit 155 may make a piece of data having a degree of association with each piece of similar data no smaller than a threshold value be a piece of relevant data.

Next, about each piece of relevant data, the relevant rack calculation unit 155 calculates a score based on a similarity degree and a degree of association (Step S152).

For example, the relevant rack calculation unit 155 may make the product of the similarity degree between the object data and similar data and the degree of association of relevant data related to the similar data be a score of the relevant data.

Next, the relevant rack calculation unit 155 calculates a storage location score of each relevant rack which stores relevant data based on the score of the relevant data calculated in Step S152 (Step S160). For example, about each relevant rack which stores pieces of relevant data, the relevant rack calculation unit 155 may calculate the summation of scores of the pieces of relevant data stored in the rack of interest as a storage location score.

Next, the maximum capacity node acquisition unit 165 acquires the biggest remaining storage capacity of the nodes included in each relevant rack based on the remaining capacity storage unit 160 (Step S170).

Next, the write node determination unit 170 performs determination of a node and a rack which will be a placement destination based on the storage location score and the biggest remaining storage capacity of a relevant rack (Step S180).

For example, the write node determination unit 170 may rank relevant racks that are candidates by a storage location score, and make a rack of the highest storage location score be a rack of a placement destination. Here, when there is another relevant rack of the same storage location score, the write node determination unit 170 may determine a rack with a biggest remaining storage capacity that is larger as a placement destination. Alternatively, the write node determination unit 170 may determine a relevant rack with a biggest remaining storage capacity that is the largest as a placement destination. Here, when there are other racks of the same remaining storage capacity, the write node determination unit 170 may determine a rack with a higher storage location score as a placement destination. Then, the write node determination unit 170 determines a node with the largest remaining storage capacity within the rack determined as a placement destination as a node of a placement destination.

Next, the write node determination unit 170 increments the counter variable i (Step S190). Then, the operation of the master 100 returns to Step S110.

With that, the master 100 ends its operation for determining placement destinations of the object data corresponding to the number of copies.

Figure 20:
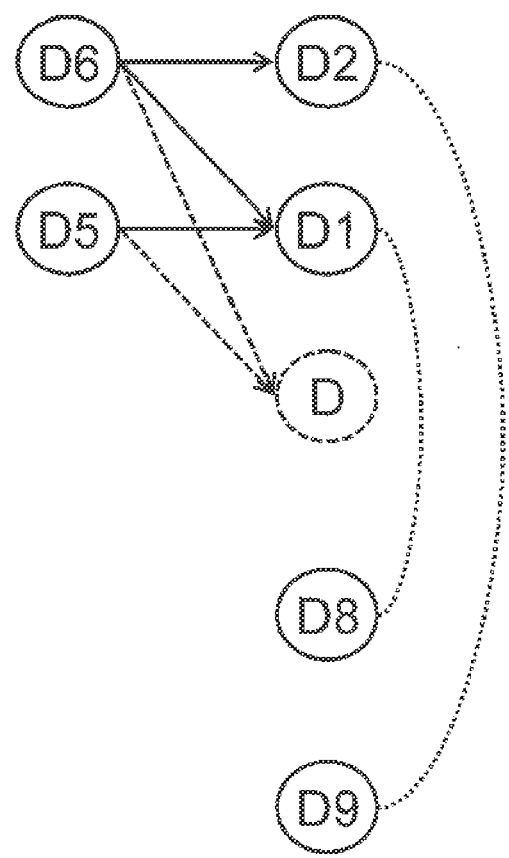
FIG. 20 is a diagram illustrating an example of a generation process and relevance of respective pieces of data in the second exemplary embodiment of the present invention.

Next, an example of operations in which the master 100 determines a placement destination of object data will be described. Here, description will be made supposing that the client 200 is placed in node N1_1 of a rack R1. FIG. 20 is a diagram illustrating an example of a process of generation of each piece of data and relevance in the second exemplary embodiment of the present invention. As is notionally shown in FIG. 20, it is supposed that the client 200 is in the process of creating data D, and, in the process of creating data D, it is reading data D5 and D6 (a dashed line in FIG. 20 represents that it is in the process of data creation).

It is supposed that data D1 which has been already stored in this distributed file system 2 has been generated taking data D5 and data D6 as input in FIG. 20. Similarly, it is supposed that data D2 which has been already stored has been generated taking data D6 as input. It is also supposed that the generation information GI of each of these pieces of data has been stored in the generation information storage unit 130 as it has been described using FIG. 12. It is supposed that data D1 and D8 which have been already stored in this distributed file system 2 have been used simultaneously in the past and have relevance with each other. It is further supposed that data D2 and data D9 also have relevance similarly. It is supposed that the degrees of association between these pieces of data have been stored in the relevance information storage unit 135 as it has been described using FIG. 13. It is further supposed that the number of copies of each piece of data set in advance in the distributed file system 2 is 2.

Operations of a master 400 in such case will be described. When the master 100 receives placement destination request information of object data from the client 200, the write node determination unit 170 initializes the counter variable i to 0, first (Step S100). Next, because the counter variable i is smaller than the number of copies 2 (in Step S110, Yes), the placement policy development unit 120 acquires one placement policy from the placement policy storage unit 110 and performs development of it (Step S120).

Here, it is supposed that the following two placement policies have been stored in the placement policy storage unit 110. The notation of the two placement policies is similar to the notation mentioned above.

Policy 1: P1 R_cur.*
Policy 2: P2~R_P1.*

In this case, the placement policy development unit 120 acquires "P1 R_cur.*" as the first placement policy. "R_cur" represents a rack in which the client 200 is placed. Accordingly, the placement policy development unit 120 develops "R_cur" into "R1" based on the corresponding information between the IP address of each node and racks stored in advance. Further, "*" represents an optional node. Here, supposing that rack R1 includes three nodes, the placement policy development unit 120 develops "*" into "N1_1, N1_2, N1_3". That is, the placement policy development unit 120 develops policy P1 as follows.

R1. {N1_1, N1_2, N1_3}

Next, because, in the developed placement policy, nodes are developed into a plurality of options, the write node determination unit 170 judges that a node of a placement destination has not been fixed yet (in Step S130, No).

Next, the relevant rack calculation unit 155 judges that a rack has been already fixed as R1 (in Step S140, Yes).

Next, the maximum capacity node acquisition unit 165 acquires a node in the fixed rack R1 having the biggest remaining storage capacity based on the remaining capacity storage unit 160 shown in FIG. 16 (Step S170). Here, the maximum capacity node acquisition unit 165 acquires N1_1 with the largest remaining storage capacity of 100 GB between the nodes included in rack R1. Next, the write node determination unit 170 determines node N1_1 of rack R1 acquired in Steps S140 and S170 as a rack and a node which will be a placement destination (Step S180).

Next, the write node determination unit 170 increments the counter variable i to make it 1, and repeats the operations from Step S110. Because the counter variable i=1 and it is smaller than the number of copies 2 (in Step S110, Yes), the placement policy development unit 120 acquires and develops the next policy from the placement policy storage unit 110.

In the above-mentioned example, the placement policy development unit 120 acquires "R_cur.*". Here, because R_cur is R1, ~R_cur indicates the racks besides rack R1. Accordingly, a placement policy 120 develops the acquired placement policy as follows (Step S120). Meanwhile, here, it is supposed that the racks which the distributed file system 2 manages are R1-R20.

{R2, R3, . . . , R19, R20}.*

Next, the write node determination unit 170 judges that a node has not been fixed (Step S130).

Then, the relevant rack calculation unit 155 judges that a rack has not been fixed (Step S140).

Next, the relevant rack calculation unit 155 calculates a similarity degree of, among other pieces of data which has been already stored in the distributed file system 2, each of similar data D1 (input data is D5 and D6) and similar data D2 (input data is D6), whose generation information GI are similar to the generation information GI of data D which is the object data (input data is D5 and D6). (Step S150).

Specifically, the relevant rack calculation unit 155 calculates the cosine distance between the feature vector representing the generation information GI of the object data D and the feature vector representing the generation information GI of a piece of existing data. Here, a cosine distance is defined as COS (DX, DY)=VX*VY/(|VX|×|VY|), where, DX and DY indicate data, respectively, and VX and VY represent a feature vector of generation information GI of each of data DX and DY. VX*VY represents the inner product of the two feature vectors VX and VY. |VX| represents the length of feature vector VX. |VY| represents the length of feature vector VY.

The relevant rack calculation unit 155 calculates cosine distances between the feature vector of the object data D and the feature vectors of data D1 and D2 shown in FIG. 12 as follows.

<Similarity Degree Between Object Data D and Similar Data D1>

$COS(D,D1)=1$

<Similarity Degree Between Object Data D and Similar Data D2>

$COS(D,D2)=1/\sqrt{2}\approx0.707$

Meanwhile, as a function to calculate a score of relevant data, the inner product of vectors and other functions are also applicable in addition to a cosine distance.

Next, the relevant rack calculation unit 155 acquires from the relevance information storage unit 135 a degree of association of relevant data having relevance with the similar data D1 and D2 for which a similarity degree has been calculated (Step S151).

Here, based on the relevance information storage unit 135 shown in FIG. 13, the relevant rack calculation unit 155 acquires data D8 having relevance with the similar data D1 as relevant data. Similarly, the relevant rack calculation unit 155 acquires data D9 having relevance with the similar data D2 as relevant data. Then, the relevant rack calculation unit 155 acquires the following numerical values as respective degrees of association.

<The Degree of Association Between the Similar Data D1 and the Relevant Data D8>

0.8.

<The Degree of Association Between the Similar Data D2 and the Relevant Data D9>

0.6.

Next, the relevant rack calculation unit 155 calculates a score of the relevant data D8 and D9 based on a similarity degree and a degree of association (Step S152). Here, it is supposed that the product of a similarity degree and a degree of association is employed as a score.

<The Ranking by the Score of Relevant Data>

D8 0.8=1×0.8

D9 0.424=0.707×0.6

Thus, by the operations (processing) of Steps S150-S152, pieces of relevant data related to pieces of similar data whose generation information GI are similar to that of the object data D have been ranked based on a score. In other words, it can be thought that pieces of relevant data with a high possibility of being used simultaneously in the future with the object data D which is in the process of being generated have been ranked.

Next, the relevant rack calculation unit 155 acquires storage locations of the relevant data D8 and D9 from the storage location storage unit 150.

<Storage Location of Relevant Data D8>
R11, R12
<Storage Location of Relevant Data D9>
R11, R13

Then, about these relevant racks R11, R12 and R13, the relevant rack calculation unit 155 calculates a storage location score based on the score of stored relevant data (Step S160). Here, it is supposed that the summation of the scores of pieces of stored relevant data is employed as a storage location score of the relevant rack.

<The Score of the Storage Location Score of Rack R11=the Score of Relevant Data D8+the Score of Relevant Data D9>

0.8+0.424=1.224

<The Storage Location Score of Rack R12=the Score of Relevant Data D8>
R12: 0.8
<The Storage Location Score of Rack R13=the Score of Relevant Data D9>
R13: 0.424

Then, the relevant rack calculation unit 155 excludes ones which do not meet the placement policy developed in Step S120 from the racks having been ranked by a storage location score as mentioned above. Here, because the placement policy developed in Step S120 is {R2 . . . and R20}.*, there are no racks to be excluded.

Next, about candidate racks R11, R12 and R13, the maximum capacity node acquisition unit 165 acquires a node having a remaining storage capacity that is the biggest from the remaining capacity storage unit 160 shown in FIG. 16 as follows (Step S160). A storage location score of a rack including each node is being also described below.

<Storage Location Score and the Biggest Remaining Storage Capacity of Rack R11>
R11.N11_2 (1.224, 90 GB)<
<Storage Location Score and the Biggest Remaining Storage Capacity of Rack R12>
R12.N12_3 (0.8, 120 GB)<
<Storage Location Score and the Biggest Remaining Storage Capacity of Rack R13>
R13.N13_3 (0.424, 100 GB)

Next, the write node determination unit 170 determines one of the respective storage locations having been ranked in Step S160 as a placement destination based on a storage location score and a remaining storage capacity (Step S180).

For example, when a storage location score is given weight, by sorting the above-mentioned ranking data in descending order by a storage location score, and sorting further in descending order by a biggest remaining storage capacity when there are identical storage location scores, the write node determination unit 170 determines a rack and a node of the top rank as a placement destination. Or, when a remaining storage capacity is given weight, by sorting the above-mentioned ranking data in descending order by a remaining storage capacity, and sorting further in descending order by a score when there are same capacities, the write node determination unit 170 determines a rack and a node of the top rank as a placement destination. Or, the write node determination unit 170 may decide, among nodes included in racks to be a candidate, a rack and a node having the highest storage location score among ones having a remaining storage capacity exceeding a threshold value as a placement destination. In other words, a placement destination may be decided by other algorithms based on a storage location score and a remaining storage capacity. Meanwhile, here, the write node determination unit 170 determines R11.N11_2 having the largest storage location score as a placement destination.

Next, the write node determination unit 170 increments the counter variable i, and makes it 2. (Step S190). Next, because the counter variable i is not smaller than the number of copies 2 (in Step S110, No), the write node determination unit 170 returns the following two placement destinations to the client 200.

R1.N1_1
R11.N11_2

By this, description of the example of operations in which the master 100 determines a placement destination of object data is finished.

Figure 21:
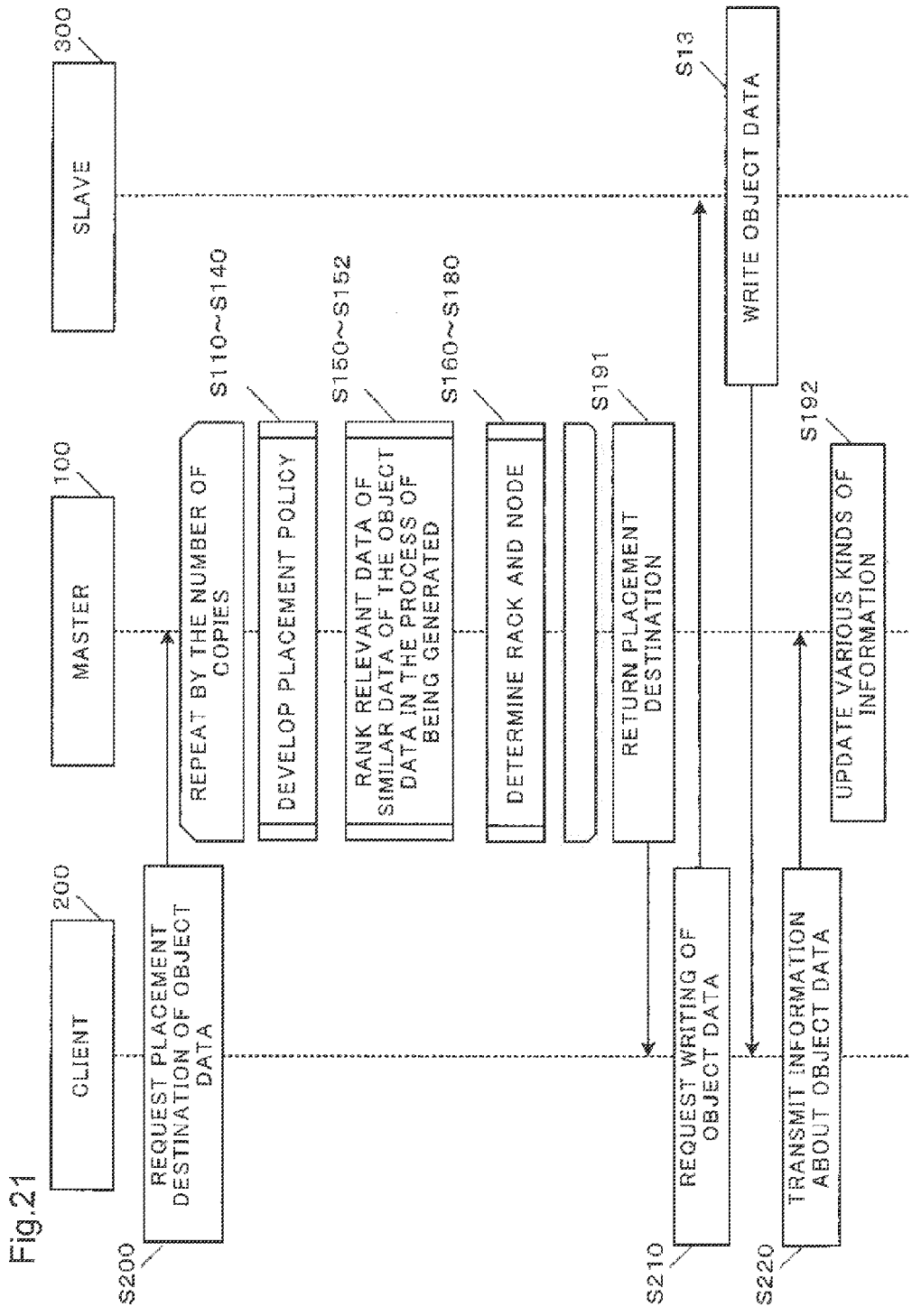
FIG. 21 is a sequence diagram illustrating operations of a distributed file system as the second exemplary embodiment of the present invention.

Next, operations of the distributed file system 2 when the client 200 stores object data in the distributed file system 2 newly will be described with reference to FIG. 21.

First, the client 200 transmits placement destination request information for object data which is in the process of being generated newly to the master 100 (Step S200). At that time, the client 200 may include information representing data which is being read in the processing that is in the process of generating the object data in the placement destination request information and transmit it.

In the above-mentioned example, the placement destination requesting unit 210 of the client 200 transmits placement destination request information including information representing data D5 and D6 which is in the process of being read at present to the master 100.

Next, by repeating Steps S110-S180 by the number of times corresponding to the number of copies set in advance, the master 100 that has received the inquiry determines placement destinations corresponding to the number of copies, and returns them to the client 200 (Step S191).

In the above-mentioned example, as placement destinations of the number of copies 2, the master 100 returns R1.N1_1 and R11.N11_2 to the client 200.

Next, the write requesting unit 220 of the client 200 transmits a write request of the object data to each of the placement destinations that have been returned (Step S210). Next, the data reading and writing unit 310 of the slave 300 receives the write request, and stores the object data in the data storage unit 320 (Step S13). The slave 300 notifies the client 200 to the effect that the object data has been written.

Next, the writing completion notification unit 230 of the client 200 transmits information about the object data to the master 100 (Step S220). For example, the writing completion notification unit 230 may transmit the generation information GI of the object data, information representing the rack and the node of a placement destination, and the object data size and the like to the master 100.

In the above-mentioned example, the client 200 transmits information D representing D5 and D6 as the generation information GI of the object data D, information representing R1.N1_1 and R11.N11_2 as placement destination information and information representing the size of the object data D.

Next, the information update unit 180 of the master 100 that has received the writing completion notification updates the generation information storage unit 130, the storage location storage unit 150 and the remaining capacity storage unit 160 (Step S192).

In the above-mentioned example, the information update unit 180 adds a row about data D to the generation information storage unit 130, and stores 1 in the columns about D5 and D6 in that row. In addition to adding a row about data D to the storage location storage unit 150, the information update unit 180 stores R1.N1_1 and R11.N11_2 as its storage locations. The information update unit 180 updates the remaining storage capacities of R1.N1_1 and R11.N11_2 stored in the remaining capacity storage unit 160 based on the size of data D.

Next, an effect of the second exemplary embodiment of the present invention mentioned above will be described.

A distributed file system and a master device as the second exemplary embodiment can determine, as placement destinations of object data and its copies, storage locations which are the most suitable for speeding up future processing which uses a plurality of pieces of data including the object data simultaneously, even when the object data is stored newly before use of it.

The reason of this is as follows.
That is:
the relevant data acquisition unit 140 calculates a score of relevant data related to similar data generated taking the same data as data used for generation of object data as input;
the relevant rack calculation unit 155 calculates a storage location score based on the calculated score; and
the write node determination unit 170 determines as a placement destination of each copy a storage location that satisfies a condition of a placement policy and, in addition, that has a high calculated storage location score.

Here, it can be thought that relevant data which is used simultaneously with data whose generation process is similar to that of object data has a high possibility to be used simultaneously also with the object data. As a result, even when object data is stored in a distributed file system newly, the second exemplary embodiment can place copies of the object data in a distributed manner in several racks in which relevant data having a high possibility of being used simultaneously with the object data has been already stored. Therefore, according to this exemplary embodiment, in processing which will use a plurality of pieces of data including object data simultaneously in the future, a possibility that the processing is concluded within a rack is increased, and speeding up of such processing can be realized.

According to this exemplary embodiment, by determining a node having a large remaining storage capacity among nodes included in a storage location of a high storage location score as a placement destination of each copy, a balance of a load among racks can be kept while speeding up future processing which uses a plurality of pieces of data including object data simultaneously.

The Third Exemplary Embodiment

Next, the third exemplary embodiment of the present invention will be described in detail with reference to a drawing. Meanwhile, in each drawing referred to in description of this exemplary embodiment, an identical code is attached to a structure identical with and a step which operates similarly to that of the second exemplary embodiment of the present invention, and detailed description in this exemplary embodiment will be omitted.

A distributed file system 3 in the third exemplary embodiment is different from the distributed file system 2 in the second exemplary embodiment mentioned above in a point that it includes a master 400 in place of the master 100 and a client 500 in place of the client 200. The master 400, the client 500 and the slave 300 are connected so as to be able to communicate with each other by a network configuration which takes a rack as a base unit like the second exemplary embodiment mentioned above with reference to FIG. 8 and FIG. 9.

Because the hardware configurations of the master 400 and the client 500 are similar to those of the master 10 and the client 20 as the first exemplary embodiment of the present invention described with reference to FIG. 2, description in this exemplary embodiment will be omitted.

Figure 22:
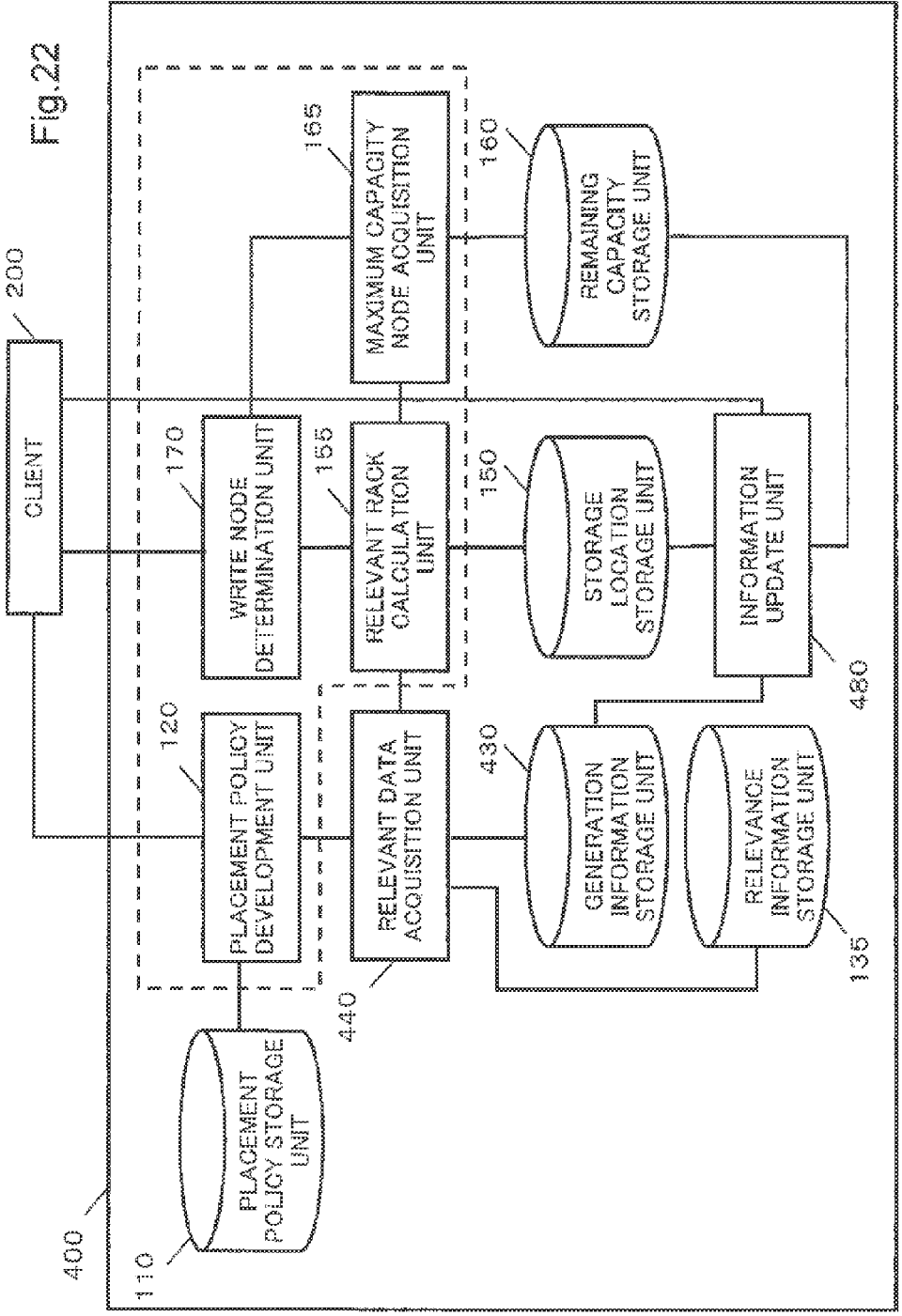
FIG. 22 is a functional block diagram of a master device in a third exemplary embodiment of the present invention.

Next, a function block structure of the master 400 will be described with reference to FIG. 22. In FIG. 22, the master 400 is different from the master 100 as the second exemplary embodiment mentioned above in a point that it includes a generation information storage unit 430 in place of the generation information storage unit 130, a relevant data acquisition unit 440 in place of the relevant data acquisition unit 140, an information update unit 480 in place of the information update unit 180.

About each piece of data which has been already stored in the distributed file system 3, the generation information storage unit 430 stores generation program information representing an application program which has generated each piece of data as generation information GI. An example of information which the generation information storage unit 430 stores in this case is shown in FIG. 23.

The relevant data acquisition unit 440 is constituted about the same as the relevant data acquisition unit 140 in the second exemplary embodiment mentioned above. However, in the third exemplary embodiment, the relevant data acquisition unit 440 is different from the second exemplary embodiment in a processing configuration for acquiring data which has been generated by an application program identical with the application program in which the object data has been generated as similar data similar to the object data.

The relevant data acquisition unit 440 performs scoring of relevant data supposing that a similarity degree of each piece of similar data generated by an application program identical with that of the object data is identical. For example, the relevant data acquisition unit 440 may employ a degree of association between similar data and relevant data as a score of relevant data having relevance with each piece of similar data generated by an application program identical with that of the object data just as it is.

The information update unit 480 is different from the information update unit 180 in the second exemplary embodiment mentioned above in a processing configuration which updates information in the generation information storage unit 430 using generation program information of the object data for which writing has been finished. Meanwhile, by receiving generation program information on object data from the client 500, the information update unit 480 may perform these updates. Or, the information update unit 480 may acquire generation program information on object data by analyzing a data access history to perform these updates.

Figure 24:
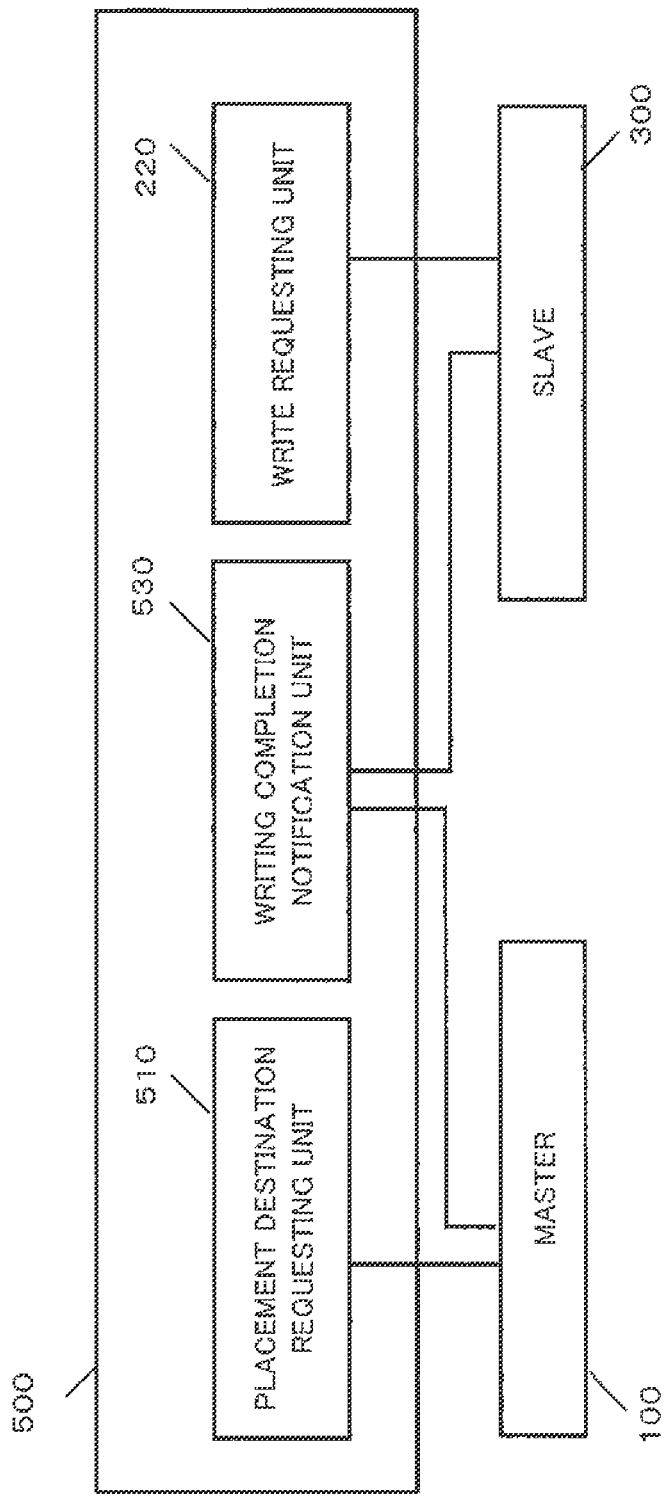
FIG. 24 is a functional block diagram of a client device in the third exemplary embodiment of the present invention.

Next, a function block structure of the client 500 according to the third exemplary embodiment will be described with reference to FIG. 24. In FIG. 24, the client 500 is different from the client 200 in the second exemplary embodiment in a point that it includes a placement destination requesting unit 510 in place of the placement destination requesting unit 210, and a writing completion notification unit 530 in place of the writing completion notification unit 230.

That is, when compared with the placement destination requesting unit 210 in the second exemplary embodiment mentioned above, the placement destination requesting unit 510 according to the third exemplary embodiment is different in the contents of information transmitted to the master 400 when making inquiry about a placement destination of object data which is in the process of being generated to the master 400. Specifically, the placement destination requesting unit 510 transmits generation program information of the object data (that is, the generation information GI of the object data) to the master 400 by including it in placement destination request information for the object data.

Next, when compared with the writing completion notification unit 230 in the second exemplary embodiment mentioned above, the writing completion notification unit 530 is different in the contents of information transmitted to the master 400. Specifically, following the completion of writing of the object data, the writing completion notification unit 530 further transmits generation program information of the object data to the master 400.

Operations of the distributed file system 3 constituted as above will be described.

First, operations in which the master 400 determines placement destinations of object data will be described with reference to FIG. 25. Meanwhile, it is supposed that generation program information and relevance information of each piece of data which has been already stored in the distributed file system 3 are being stored in the generation information storage unit 430 and the relevance information storage unit 135. It is also supposed that, in the distributed file system 3, the number of copies when storing a copy of each piece of data has been set in advance.

When placement destination request information for the object data is received from the client 500, the master 400 begins operations (processing) of the flow chart shown in FIG. 25. At that time, it is supposed that generation program information in the process of generating the object data in the client 500 is included in the placement destination request information received from the client 500.

In FIG. 25, operations in which the master 400 decides a placement destination is different from the operations of the master 100 in the second exemplary embodiment mentioned above with reference to FIG. 19 in a point that Step S650 is carried out instead of Step S150 and Step S652 is carried out instead of Step S152.

In Step S650, as similar data of the object data, the relevant rack calculation unit 155 acquires data whose generation program information is identical with that of the object data based on the generation information storage unit 430.

In Step S652, the relevant data acquisition unit 440 calculates the score of each piece of relevant data supposing that the similarity degrees of respective pieces of similar data acquired in Step S650 are identical (1, for example).

By this, description of the operations in which the master 400 determines a placement destination is ended.

Next, operations of the distributed file system 3 when the client 500 stores object data in the distributed file system 3 newly will be described with reference to FIG. 26.

First, the client 500 transmits placement destination request information for the object data which is in the process of being generated newly to the master 400 (Step S700). At that time, the client 500 may transmit information on a generation program that is in the process of generating the object data by including it in placement destination request information.

Next, by repeating Steps S110-S140, S650-S652 and S160-S180 by the number of times corresponding to the number of copies set in advance, the master 400 that has received the inquiry determines a placement destinations corresponding to the number of copies and returns the determined result to the client 500 (Step S191).

Next, the write requesting unit 220 of the client 500 transmits a write request of the object data to the slave 300 of each of the returned placement destinations (Step S210). Next, the data reading and writing unit 310 of the slave 300 receives the write request and directs the data storage unit 320 to store the object data (Step S13). Then, the slave 300 notifies the client 500 that the object data has been written.

Next, the client 500 transmits information about the object data to the master 400 (Step S720). At that time, the client 500 may transmit generation program information of the object data, information representing the rack and the node of a placement destination and the object data size.

Next, the information update unit 480 of the master 400 that has received the writing completion notification updates the generation information storage unit 430, the storage location storage unit 150 and the remaining capacity storage unit 160 (Step S692).

Next, the effect of the third exemplary embodiment of the present invention will be described.

A distributed file system and a master device as the third exemplary embodiment mentioned above are able to determine, even when object data is generated taking data which has not been read as input at the time of generating other pieces of data having been stored in a distributed file system as input, placement destinations of the object data so that future processing which uses a plurality of pieces of data including the object data simultaneously may speed up.

The reason of this is as follows.

That is:

the generation information storage unit 430 stores generation program information on each data as the generation information GI of each piece of data;

the relevant data acquisition unit 440 acquires relevant data which has been used simultaneously with similar data having been generated by an identical application program with object data; and the relevant data acquisition unit 440 determines a storage location having a high storage location score among storage locations which store such relevant data as a placement destination of the object data.

More specifically, assume that, in a client, an application program A has generated data D newly using data B and data C, and made an inquiry about placement destinations of it to the master, for example. In this case, according to this exemplary embodiment, even if other pieces of data generated using data B and data C have not been stored in the distributed file system, the relevant data acquisition unit 440 of the master 400 can know by analogy that relevant data which has an experience of been used simultaneously with similar data generated by the application program A in the past would be relevant data having a possibility that the object data D is related to it in the future. This well explains the reason.

The third exemplary embodiment may be implemented in combination with the second exemplary embodiment. In this case, the generation information storage unit 430 in the third exemplary embodiment mentioned above stores, about each piece of data stored in the distributed file system 3, at least one kind of information between input data information and generation program information as generation information GI. Then, the client 500 is made to be of a processing configuration in which it transmits at least one kind of information between input data information and generation program information about the object data by including it in placement destination request information for the object data. Then, the relevant data acquisition unit 440 of the master 400 acquires relevant data related to similar data to which at least one kind of input data information and generation program information is similar to that of the object data.

By adopting such device configuration (processing configuration), even when object data is generated by reading data which has not been used as input data by the generation process of other pieces of data, or even when object data is generated by an application program which has not been used for generation of other pieces of data in the past, the third exemplary embodiment of the present invention can know by analogy relevant data related to similar data of the object data using one kind of the information. As a result, according to this exemplary embodiment, even in any of such cases, a placement destination of the object data can be determined.

In the third exemplary embodiment, the generation information storage unit 430 may memorize a data format applied when the object data has been generated as generation information GI. Here, an example of a data format is indicated below. This example represents a format of data (data format) expressed in a text.

Example 1

UserID [word Score]+

Example 2

INT [STRING DOUBLE]+

Meanwhile, in the above-mentioned examples, "[X]+" represents that "X" is repeated for the arbitrary number of times By thus composing, according to the third exemplary embodiment mentioned above, there is realized an appropriate support to a case where existing other pieces of data generated using the same input data as the input data which has been used in the processing of generating object data are not stored in a distributed file system, and, at the same time, existing other pieces of data which has been generated by an application program that is in the process of generating the object data are not being stored in the distributed file system.

That is, according to this exemplary embodiment, a placement destination of the object data can be determined even in such case because relevant data of similar data whose data format is similar to that of the object data can be known by analogy if there exists another data generated with a data format identical with that of the object data.

Meanwhile, in each of the exemplary embodiments mentioned above, description has been made focusing on an example in which a master device (10, 100, and 400) receives the generation information GI of object data which is needed in order to determine a placement destination of the object data from a client device. However, a master device of each of the exemplary embodiments does not have to receive the generation information GI of object data from a client device necessarily. For example, by analyzing a data access history to a distributed file system, a master device of each of the exemplary embodiments may acquire input data information (generation information GI) about object data. Or, by analyzing the contents of the object data, a master device of each of the exemplary embodiments can acquire the data format of it (generation information GI).

In the second and third exemplary embodiments mentioned above, description has been made centering on an exemplary configuration in which a master device (100, 400) acquires information representing a rack and a node of a client device which is needed in order to develop a placement policy from corresponding information between a rack and an IP address of each node stored in advance. However, the present invention described taking the second and third exemplary embodiments as an example is not limited to such structure, and, in addition to such exemplary configuration, a master device in the second and third exemplary embodiments may receive information representing the rack and the node of a client device from the client device along with placement destination request information.

In the second and third exemplary embodiments mentioned above, a client device has been described as a device placed in one of nodes of one of racks which a distributed file system manages. However, a client device in the second and third exemplary embodiments may be a device connected outside a distributed file system. In that case, a placement policy development unit of a master device should select an optional rack and node as information representing a rack and a node of a client device needed for development.

In each of the exemplary embodiments mentioned above, a master device has been described focusing on an exemplary configuration in which information needed for information update performed after object data has been stored is received from a client device. However, a master device of each of the exemplary embodiments does not have to receive information needed for information update from a client device necessarily. For example, a master device of each of the exemplary embodiments can acquire from a slave device which has finished writing the object data information about the storage location and the remaining storage capacity.

In each of the exemplary embodiments mentioned above, object data has been described taking the case where it is data having been generated newly in processing which is being carried out in a client device as an example. However, the present invention is not limited to such example, and, as another exemplary configuration, object data may be data which has been made by copying data already stored in a distributed file system by a user operation. In this case, as the generation information GI and relevance information of object data, a master device can determine a placement destination of the object data by copying the generation information GI and the relevance information of the original data.

In each of the exemplary embodiments mentioned above, object data may be data which has been already stored in a distributed file system. In such case, the generation information GI and relevance information of each piece of data and the remaining storage capacity of each node may be changed from the time when the object data has been stored in a placement destination determined by a master device last time. Accordingly, in such case, a master device of each of the exemplary embodiments may determine a placement destination newly at timing when the object data is updated or at periodic timing. As a result, the master device can update a placement destination for speeding up future processing including the object data appropriately.

In each of the exemplary embodiments mentioned above, object data may be data made by internally dividing one file into a plurality of blocks logically. In this case, a different slave device will store each block. In such case, a master device of each of the exemplary embodiments can be applied to determination of a placement destination of each block. In such case, a master device of each of the exemplary embodiments may determine a placement destination of each block newly at timing when a target file is updated by a user operation. As a result, even when a change occurs in the number of divided blocks due to a size change of a target file, a master device of each of the exemplary embodiments can carry out determination of a placement destination of a new block.

The operations of a client device and a slave device which have been described in each of the exemplary embodiments mentioned above and the operations of a master device having been described with reference to the flow charts (FIG. 6, FIG. 19 and FIG. 25) may be realized by storing them in a storage device (storage medium) of an information processing device (10, 20 or 30) as a computer program, and a CPU (1001, 2001 and 3001) reading and executing the computer program. In such case, it can be considered that the present invention is configured by the codes of such computer program or by a computer-readable storage medium which stores the codes.

Moreover, the function blocks of a device described in each of the exemplary embodiments mentioned above have been described taking a case where they are carried out in a device (information processing device) of a stand-alone type as an an example for convenience of explanation. However, the present invention that has been described taking each of the exemplary embodiments mentioned above as an example is not limited to these equipment configurations, and the various functions that have been realized in a device of a stand-alone type in each of the exemplary embodiments mentioned above may be realized by a plurality of information processing devices which can communicate with each other in a distributed manner, for example. In this case, a so-called virtual machine may be adopted as the plurality of information processing devices.

The respective exemplary embodiments mentioned above can be carried out in a combined manner appropriately.

The present invention is not limited to each of the exemplary embodiments mentioned above, and it can be carried out in various aspects.

Although part or all of the above-mentioned exemplary embodiments can also be described as, but not limited to, the following supplementary notes.

(Supplementary Note 1)

An information processing device, including:

a storage location storage unit to store information representing a storage location of each piece of data stored in a distributed file system;

a generation information storage unit to store generation information about a generating process of the data;

a relevance information storage unit to store relevance information representing relevance between the data and another piece of the data being accessed in identical processing;

a relevant data acquisition unit to acquire the generation information about object data to be an target of determining a placement destination in the distributed file system from the generation information storage unit, acquire, among other pieces of data having been already stored in the distributed file system, similar data similar to the generation information acquired about the object data from the generation information storage unit, and acquire from the relevance information storage unit relevant data having the relevance with the similar data having been acquired;

a placement destination determination unit to determine a storage location to be a placement destination of the object data based on the storage location of the relevant data; and an information update unit to update information stored in the storage location storage unit and the generation information storage unit following storage of the object data to the storage location determined by the placement destination determination unit.

(Supplementary Note 2)

The information processing device according to supplementary note 1, further including:

a placement policy storage unit to store a placement policy representing a condition about a placement destination of each of a plurality of pieces of identical object data obtained by copying the object data, wherein the placement destination determination unit determines, about each of the plurality of pieces of identical object data, a storage location of a placement destination based on the placement policy and a storage location of the relevant data.

(Supplementary Note 3)

The information processing device according to supplementary note 1 or supplementary note 2, further including:

a remaining capacity storage unit to store, upon the storage location including no smaller than one node, a remaining storage capacity of each of the nodes, wherein the placement destination determination unit determines a node of a placement destination based on a storage location of the relevant data and a remaining storage capacity of a node included in the storage location.

(Supplementary Note 4)

An information processing device according to supplementary notes 1 to 3, wherein the generation information storage unit stores, about each piece of data having been already stored in the distributed file system, input data information representing another piece of data having been accessed in processing of generating the each piece of data as the generation information.

(Supplementary Note 5)

The information processing device according to any one of supplementary notes 1 to 4, wherein the generation information storage unit stores, about each piece of data having been already stored in the distributed file system, generation program information representing an application program having generated the each piece of data as the generation information.

(Supplementary Note 6)

The information processing device according to any one of supplementary notes 1 to 5, wherein the generation information storage unit stores, about each piece of data having been already stored in the distributed file system, data format information representing a data format having been applied on a occasion of generating the each piece of data as the generation information.

(Supplementary Note 7)

An information processing device according to any one of supplementary notes 1 to 6, wherein the relevant data acquisition unit calculates, about the similar data, a similarity degree representing a degree of similarity of the generation information to the object data, calculates a degree of association representing a degree of relevance of the relevant data to the similar data, and calculates a score of the relevant data based on the similarity degree and the degree of association having been calculated, and wherein the placement destination determination unit calculates, about each storage location storing the relevant data, a storage location score based on the score of the relevant data being stored, and, based on the calculated storage location score, determines a storage location to be a placement destination of the object data.

(Supplementary Note 8)

A distributed file system, including:

a master device as an information processing device according to any one of supplementary notes 1 to 7;

no smaller than one grouped slave device;

a storage location storage unit of the master device storing, as a storage location of the data, information representing the slave device storing the data and a group including the slave device;

a relevant data acquisition unit of the master device acquiring the relevant data according to an inquiry about a placement destination of the object data made by an external client device;

based on a group including a slave device storing the relevant data, the placement destination determination unit determining a slave device of a placement destination of the object data, and transmitting information representing the determined slave device to the client device as the placement destination; and the slave device storing the object data according to a write request from the client device.

(Supplementary Note 9)

A distributed file system according to supplementary note 8, wherein the master device further includes a placement policy storage unit to store a placement policy representing a condition about a placement destination of each of a plurality of pieces of identical object data obtained by copying the object data, wherein the placement destination determination unit of the master device determines, about each of the plurality of pieces of identical object data, a slave device to be a placement destination based on the placement policy and a storage location of the relevant data, respectively, and transmits a result of determination to the client device.

(Supplementary Note 10)

A client device, including:

a placement destination requesting unit to make an inquiry about a placement destination of the object data to a master device included in a distributed file system according to supplementary note 8 or supplementary note 9;

a write requesting unit to request writing of the object data to a slave device as a placement destination received from the master device; and a writing completion notification unit to transmit information about the object data to the master device following writing completion of the object data.

(Supplementary Note 11)

An information processing method, including the steps of:

storing information representing a storage location of each piece of data to be stored in a distributed file system in a first storage device;

storing generation information about a generating process of the data in a second storage device;

storing relevance information representing relevance about the data and another piece of the data being accessed in identical processing in a third storage device;

acquiring the generation information about object data to be an target of determining a placement destination in the distributed file system from the second storage device, and acquiring, among other pieces of data having been already stored in the distributed file system, similar data similar to the generation information acquired about the object data from the second storage device;

acquiring, among other pieces of data having been already stored in the distributed file system, relevant data having the relevance with the similar data from the third storage device;

determining a storage location to be a placement destination of the object data based on the storage location of the relevant data; and updating information stored in the first and second storage devices following storage of the object data to a storage location having been determined.

(Supplementary Note 12)

The information processing method according to supplementary note 11, wherein a placement policy representing a condition about a placement destinations of each of a plurality of pieces of identical object data obtained by copying the object data is stored in a fourth storage device, and wherein, about each of the a plurality of pieces of identical object data, a storage location of a placement destination is determined, respectively, based on the placement policy and a storage location of the relevant data.

(Supplementary Note 13)

An information processing method, including the steps of:

a master device storing information representing a storage location of each piece of data to be stored in a distributed file system, storing generation information about a generating process of the data, and storing relevance information representing relevance about the data and another piece of the data being accessed in identical processing;

a client device make an inquiry about a placement destination of object data to the master device;

the master device acquiring similar data having the generation information similar to that of the object data among other pieces of data having been already stored in the distributed file system by acquiring the generation information on the object data, acquiring relevant data having the relevance with the similar data among other pieces of data having been already stored in the distributed file system, determining a storage location as a placement destination of the object data based on the storage location of the relevant data, and returning a determined storage location to the client device;

the client device requesting storage of the object data to a slave device belonging to the storage location having been returned;

the slave device storing the object data; and the master device adding and storing a storage location and generation information of the object data.

(Supplementary Note 14)

The information processing method according to supplementary note 13, wherein the master device further stores placement policies representing a condition about a placement destination of each of a plurality of pieces of identical object data obtained by copying the object data, and according to an inquiry about a placement destination of the object data from the client device, determines, about each of the plurality pieces of identical object data, a slave device to be a placement destination, respectively, based on the placement policy and a storage location of the relevant data, and transmits a result to the client device, and wherein the client device requests storage of the object data respectively to the slave devices as a plurality of placement destinations.

(Supplementary Note 15)

A computer program making a computer execute:

a storage location memory function to store information representing a storage location of each piece of data to be stored in a distributed file system in a first storage device;

a generation information memory function to store generation information about a generating process of the data in a second storage device;

a relevance information storage function to store relevance information representing relevance between the data and another piece of the data being accessed in identical processing in a third storage device;

a similar data acquisition function to acquire the generation information about object data to be an target of determining the placement destination in the distributed file system from the second storage device, and acquiring, among other pieces of data having been already stored in the distributed file system, similar data similar to the generation information acquired about the object data from the second storage device;

a relevant data acquisition function to acquire, among other pieces of data having been already stored in the distributed file system, relevant data having the relevance with the similar data from the third storage device;

a placement destination determination function to determine a storage location to be a placement destination of the object data based on the storage location of the relevant data; and an information updating function to update information stored in the first and second storage devices following storage of the object data to a storage location determined by the placement destination determination function.

(Supplementary Note 16)

The information processing method according to supplementary note 15, further making the computer execute a placement policy storage function to store a placement policy representing a condition about a placement destination of each of a plurality of pieces of identical object data obtained by copying the object data in a fourth storage device, wherein, upon performing placement destination determination function, a slave device to be a placement destination is determined about each of the plurality of pieces of identical object data, respectively, based on the placement policy and a storage location of the relevant data.

The present invention has been described taking the exemplary embodiments mentioned above as an exemplary example. However, the present invention is not limited to the exemplary embodiments mentioned above. That is, various aspects which a person skilled in the art can understand can be applied to the present invention within the scope of the present invention.

This application claims priority based on Japanese application Japanese Patent Application No. 2011-061045, filed on Mar. 18, 2011, the disclosure of which is incorporated herein in its entirety.

REFERENCE SIGNS LIST 1, 2 and 3 Distributed file system
10, 100 and 400 Master
20, 200 and 500 Client
30 and 300 Slave
11 and 150 Storage location storage unit
12, 130 and 430 Generation information storage unit
13 and 135 Relevance information storage unit
14, 140 and 440 Relevant data acquisition unit
15 Placement destination determination unit
16, 180 and 480 Information update unit
21, 210 and 510 Placement destination requesting unit
22 and 220 Write requesting unit
23, 230 and 530 Writing completion notification unit
31 and 310 Data reading and writing unit
32 and 320 Data storage unit
110 Placement policy storage unit
120 Placement policy development unit
155 Placement destination determination unit
160 Remaining capacity memory unit
165 Maximum capacity node acquisition unit
170 Write node determination unit
1001, 2001 and 3001 CPU
1002, 2002 and 3002 RAM
1003, 2003 and 3003 ROM
1004, 2004 and 3004 Storage device
1005, 2005 and 3005 Network interface
4001 or 4002 Network (communication network).

The invention claimed is:

1. An information processing system, comprising:
a memory; and
a processor configured to implement a program stored in the memory, wherein the processor comprises:
a generation information storage unit that is configured to store generation information representing a generating process of data to be stored in a distributed file system, the generation information storage unit storing the generation information to a storage device;
a relevance information storage unit that is configured to store relevance information representing relevance between the data and another piece of the data about being accessed in identical processing, the relevance information storage unit storing the relevance information to the storage device; and
a placement destination determination unit that is configured to acquire the generation information about object data to be a target of determining a placement destination in the distributed file system,
to find similar data among other pieces of data having been already stored in the distributed file system using the generation information, the similar data having a generation process similar to a generation process of the object data represented by the acquired generation information,
to find relevant data having the relevance to the found similar data by using the relevance information, and
to determine a storage location to be a placement destination of the object data based on a storage location storing the found relevant data.

2. The information processing system according to claim 1, wherein the processor further comprises:
a remaining capacity storage unit that is configured to store, when the storage location includes no smaller than one node, a remaining storage capacity of the each node, the remaining capacity storage unit storing the remaining storage capacity to the storage device,
wherein the placement destination determination unit is further configured to determine a node of a placement destination based on a storage location of the relevant data and a remaining storage capacity of a node included in the storage location.

3. The information processing system according to claim wherein the generation information storage unit stores, to the storage device, about each piece of data having been already stored in the distributed file system, data format information representing a data format having been applied on an occasion of generating the each piece of data, as the generation information.

4. The information processing system according to claim wherein the processor further comprises:
a relevant data acquisition unit that is configured to calculate, about the similar data, a similarity degree representing a degree of similarity of the generation information to the object data,
to calculate a degree of association representing a degree of relevance of the relevant data to the similar data, and
to calculate a score of the relevant data based on the similarity degree and the degree of association having been calculated, and wherein
the placement destination determination unit is further configured to calculate, about each storage location storing the relevant data, a storage location score based on the score of the relevant data being stored, and,
to determine a storage location to be a placement destination of the object data, based on the calculated storage location score.

5. The information processing system according to claim 1, wherein the processor further comprises:
a storage location storage unit that is configured to store information representing the storage location, to the storage device.

6. The information processing system according to claim 5, wherein the processor further comprises:
an information update unit that is configured to update information stored in the storage location storage unit and the generation information storage unit when the object data is stored to the storage location determined by the placement destination determination unit.

7. A distributed file system, comprising:
a master device as the information processing system according to claim 4; and
no smaller than one grouped slave device; wherein
the master device stores information representing the slave device storing the data and a group including the slave device, as a storage location of the data;
the relevant data acquisition unit, of the master device, is further configured to acquire the relevant data according to an inquiry about a placement destination of the object data made by an external client device;
the placement destination determination unit, of the master device, is further configured to determine a slave device of a placement destination of the object data, based on a group including a slave device storing the relevant data, and to transmit information representing the determined slave device to the client device as the placement destination; and
the slave device stores the object data according to a write request from the client device.

8. A client device, comprising:
a memory; and
a processor configured to implement a program stored in the memory, wherein the processor comprises:
a placement destination requesting unit that is configured to make an inquiry about a placement destination of the object data to the master device included in the distributed file system according to claim 7;
a write requesting unit that is configured to request writing of the object data to a slave device as a placement destination received from the master device; and
a writing completion notification unit that is configured to transmit information about the object data to the master device following writing completion of the object data.

9. An information processing method, comprising: storing generation information representing a generating process of data to be stored in a distributed file system in a first storage device; storing relevance information representing relevance between the data and another piece of the data being accessed in identical processing in a second storage device; acquiring the generation information about object data to be a target of determining a placement destination in the distributed file system from the first storage device, and finding out similar data from other pieces of data having been already stored in the distributed file system using the generation information, the similar data having a generation process similar to a generation process of the object data represented by the acquired generation information; acquiring relevant data having the relevance to the found-out similar data using the relevance information: and determining a storage location to be a placement destination of the object data based on a storage location storing the found-out relevant data.

10. An information processing method, comprising: a master device storing generation information representing a generating process of data to be stored in a distributed file system, and storing relevance information representing relevance between the data and another piece of the data about being accessed in identical processing; a client device making an inquiry about a placement destination of object data to the master device; the master device, by acquiring the generation information on the object data, finding out similar data from among other pieces of data having been already stored in the distributed file system using the generation information, the similar data having a generation process similar to a generation process of the object data represented by the acquired generation information, finding out relevant data having the relevance to the found-out similar data using the relevance information, and determining a storage location as a placement destination of the object data based on a storage location storing the found-out relevant data.

11. A non-transitory computer-readable recording medium that stores a computer program to allow a computer to execute:
a generation information storage function to store generation information representing a generating process of data to be stored in a distributed file system in a first storage device;
a relevance information storage function to store relevance information representing relevance between the data and another piece of the data about being accessed in identical processing in a second storage device;
a placement destination determination function to acquire the generation information about object data to be a target of determining a placement destination in the distributed file system from the first storage device, find similar data from other pieces of data having been already stored in the distributed file system using the generation information, the similar data having a generation process similar to a generation process of the object data represented by the acquired generation information, find relevant data having the relevance to the found similar data by using the relevance information, and determine a storage location to be a placement destination of the object data based on a storage location storing the found relevant data.

* * * * *